(12) United States Patent
Yamamoto

(10) Patent No.: US 11,430,609 B2
(45) Date of Patent: Aug. 30, 2022

(54) MULTILAYER CERAMIC ELECTRONIC COMPONENT

(71) Applicant: Murata Manufacturing Co., Ltd., Nagaokakyo (JP)

(72) Inventor: Takayoshi Yamamoto, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 7 days.

(21) Appl. No.: 16/930,351

(22) Filed: Jul. 16, 2020

(65) Prior Publication Data

US 2021/0057162 A1 Feb. 25, 2021

(30) Foreign Application Priority Data

Aug. 21, 2019 (JP) .............................. JP2019-150801

(51) Int. Cl.
| | |
|---|---|
| *H01G 4/30* | (2006.01) |
| *H01G 4/012* | (2006.01) |
| *H01G 2/06* | (2006.01) |
| *H01G 4/008* | (2006.01) |
| *H01G 4/12* | (2006.01) |

(52) U.S. Cl.
CPC .............. *H01G 4/30* (2013.01); *H01G 2/065* (2013.01); *H01G 4/008* (2013.01); *H01G 4/012* (2013.01); *H01G 4/1218* (2013.01)

(58) Field of Classification Search
CPC ............ H01G 4/30; H01G 4/12; H01G 4/248; H01G 4/012; H01G 4/1209; H01G 4/232; H01G 4/0085; H01G 4/1227; H01G 4/2325; H01G 4/224; H01G 2/065; H01G 4/008; H01G 4/1218
See application file for complete search history.

(56) References Cited

U.S. PATENT DOCUMENTS

| | | | | |
|---|---|---|---|---|
| 5,339,068 | A * | 8/1994 | Tsunoda ................... | H01C 1/02 338/308 |
| 10,366,834 | B1 * | 7/2019 | Lee .......................... | H01G 4/30 |
| 10,770,232 | B2 * | 9/2020 | Han ..................... | H01G 4/2325 |
| 2010/0290172 | A1 * | 11/2010 | Motoki ................ | H01G 4/2325 361/305 |

(Continued)

FOREIGN PATENT DOCUMENTS

| | | |
|---|---|---|
| JP | 11-162771 A | 6/1999 |
| JP | 2009-088319 A | 4/2009 |

(Continued)

*Primary Examiner* — Michael P McFadden
(74) *Attorney, Agent, or Firm* — Keating & Bennett, LLP

(57) ABSTRACT

A multilayer ceramic electronic component includes a stacked body, and an external electrode including an underlying electrode layer containing a conductive metal and a glass component, a resin layer containing a thermosetting resin and no metal component, and a plating layer. The underlying electrode layer extends from a first or second end surface, and covers a portion of each of first and second main surfaces and first and second lateral surfaces. The resin layer covers the underlying electrode layer on the second main surface adjacent to the first or second end surface. The plating layer covers a portion of the surface of the underlying electrode layer that is not covered with the resin layer, and covers the surface of the resin layer.

20 Claims, 11 Drawing Sheets

(56) References Cited

U.S. PATENT DOCUMENTS

| | | | |
|---|---|---|---|
| 2017/0256359 A1* | 9/2017 | Masunari | H01G 4/30 |
| 2018/0166215 A1* | 6/2018 | Hamanaka | H01G 4/232 |
| 2019/0131076 A1* | 5/2019 | Fukumura | H01G 4/2325 |
| 2019/0385795 A1* | 12/2019 | Yang | H01G 4/2325 |
| 2020/0051735 A1* | 2/2020 | Yeo | H01F 27/29 |

FOREIGN PATENT DOCUMENTS

| | | |
|---|---|---|
| JP | 2016-105488 A | 6/2016 |
| WO | 2014/024593 A1 | 2/2014 |

\* cited by examiner

MULTILAYER CERAMIC ELECTRONIC COMPONENT

CROSS REFERENCE TO RELATED APPLICATIONS

This application claims the benefit of priority to Japanese Patent Application No. 2019-150801 filed on Aug. 21, 2019. The entire contents of this application are hereby incorporated herein by reference.

BACKGROUND OF THE INVENTION

1. Field of the Invention

The present disclosure relates to a multilayer ceramic electronic component, such as a multilayer ceramic capacitor.

2. Description of the Related Art

In recent years, multilayer ceramic capacitors have been used in harsher environments than ever. For example, multilayer ceramic capacitors for use in mobile devices, such as mobile telephones and portable music players, need to withstand drop impact. Specifically, it is necessary that multilayer ceramic capacitors do not fall out of or detach from a mounting board and do not crack when subjected to drop impact.

As to multilayer ceramic capacitors for use in on-vehicle devices, such as ECUs, they need to withstand shocks from thermal cycling. Specifically, it is necessary that multilayer ceramic capacitors do not crack when subjected to bending stresses due to the thermal expansion and contraction of a mounting board caused by thermal cycling.

In view of the above, using a thermosetting conductive resin paste for the external electrodes of multilayer ceramic capacitors has been proposed. For example, Japanese Patent Laid-Open No. 11-162771 describes a countermeasure against cracking (improvement in resistance to bending) of the capacitor body, even in a harsh environment, by interposing an epoxy thermosetting conductive resin layer that contains metallic powder between a conventional underlying electrode layer and Ni plating layer.

With this structure, when stresses are generated, such as stresses due to the drop impact or bending stresses due to the thermal expansion and contraction of a mounting board caused by thermal cycling, the epoxy thermosetting conductive resin layer is peeled off the underlying electrode layer, the peeling starting from the end of the epoxy thermosetting conductive resin layer. This allows the stresses applied to the mounting board (the deformation of the mounting board) to be absorbed, thus preventing the capacitor body from cracking.

However, in the multilayer ceramic capacitor as described in Japanese Patent Laid-Open No. 11-162771, the epoxy thermosetting conductive resin layer interposed between the underlying electrode layer and the Ni plating layer increases the resistance between the underlying electrode layer and the Ni plating layer, resulting in an increased equivalent series resistance (ESR).

SUMMARY OF THE INVENTION

Preferred embodiments of the present invention provide multilayer ceramic electronic components that each have a reduced ESR while having a high resistance to cracking.

A multilayer ceramic electronic component according to a preferred embodiment of the present invention includes a stacked body, a first external electrode, and a second external electrode. The stacked body includes a plurality of ceramic layers and a plurality of internal electrode layers which are stacked. The stacked body includes a first main surface and a second main surface opposite to each other in the stacking direction, a first end surface and a second end surface opposite to each other in the length direction orthogonal to or substantially orthogonal to the stacking direction, and a first lateral surface and a second lateral surface opposite to each other in the width direction orthogonal to or substantially orthogonal to the stacking direction and the length direction. The first external electrode is disposed on the first end surface. The second external electrode is disposed on the second end surface. The second main surface of the stacked body defines and functions as a mounting surface. The first external electrode includes a first underlying electrode layer containing a conductive metal, a first resin layer containing a resin and no metal component, and a first plating layer. The second external electrode includes a second underlying electrode layer containing a conductive metal, a second resin layer containing a resin and no metal component, and a second plating layer. The first underlying electrode layer covers the first end surface, extends from the first end surface, and covers a portion of each of the first main surface, the second main surface, the first lateral surface, and the second lateral surface. The second underlying electrode layer covers the second end surface, extends from the second end surface, and covers a portion of each of the first main surface, the second main surface, the first lateral surface, and the second lateral surface. The first resin layer covers the first underlying electrode layer at least on the second main surface adjacent to the first end surface. The second resin layer covers the second underlying electrode layer at least on the second main surface adjacent to the second end surface. The first plating layer covers a portion of the surface of the first underlying electrode layer that is not covered with the first resin layer, and covers the surface of the first resin layer. The second plating layer covers a portion of the surface of the second underlying electrode layer that is not covered with the second resin layer, and covers the surface of the second resin layer.

In a multilayer ceramic electronic component according to a preferred embodiment of the present invention, the first external electrode includes a first resin layer containing a resin and no metal component, and the second external electrode includes a second resin layer containing a resin and no metal component. Therefore, the multilayer ceramic capacitor is able to reduce the ESR as compared to a multilayer ceramic capacitor including, for example, an epoxy thermosetting resin layer containing a metal component. This is because the multilayer ceramic capacitor contains no metal component and thus forms no current-carrying path, thus reducing the ESR; whereas, in a conventional multilayer ceramic capacitor which contains a metal component, the physical contact of the metal component forms a current-carrying path, thus increasing the resistance and therefore increasing the ESR.

Further, even when the multilayer ceramic electronic component is subjected to stresses due to the drop impact or bending stresses due to the thermal expansion and contraction of a mounting board caused by thermal cycling, the resin layer as described above can release the stresses applied to the mounting board (the deformation of the mounting board), thus reducing or preventing cracking of the multilayer ceramic electronic component.

Preferred embodiments of the present invention each provide a multilayer ceramic electronic component having a reduced ESR while having a high resistance to cracking.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail with reference to the accompanying drawings.

1. First Preferred Embodiment

A multilayer ceramic capacitor will now be described as an example of a multilayer ceramic electronic component according to a first preferred embodiment of the present invention. This preferred embodiment describes a typical two-terminal capacitor as an example. However, the present preferred embodiment is not limited to a two-terminal capacitor, and may also be applied to a multi-terminal capacitor.

(1) Multilayer Ceramic Capacitor

Figure 1:
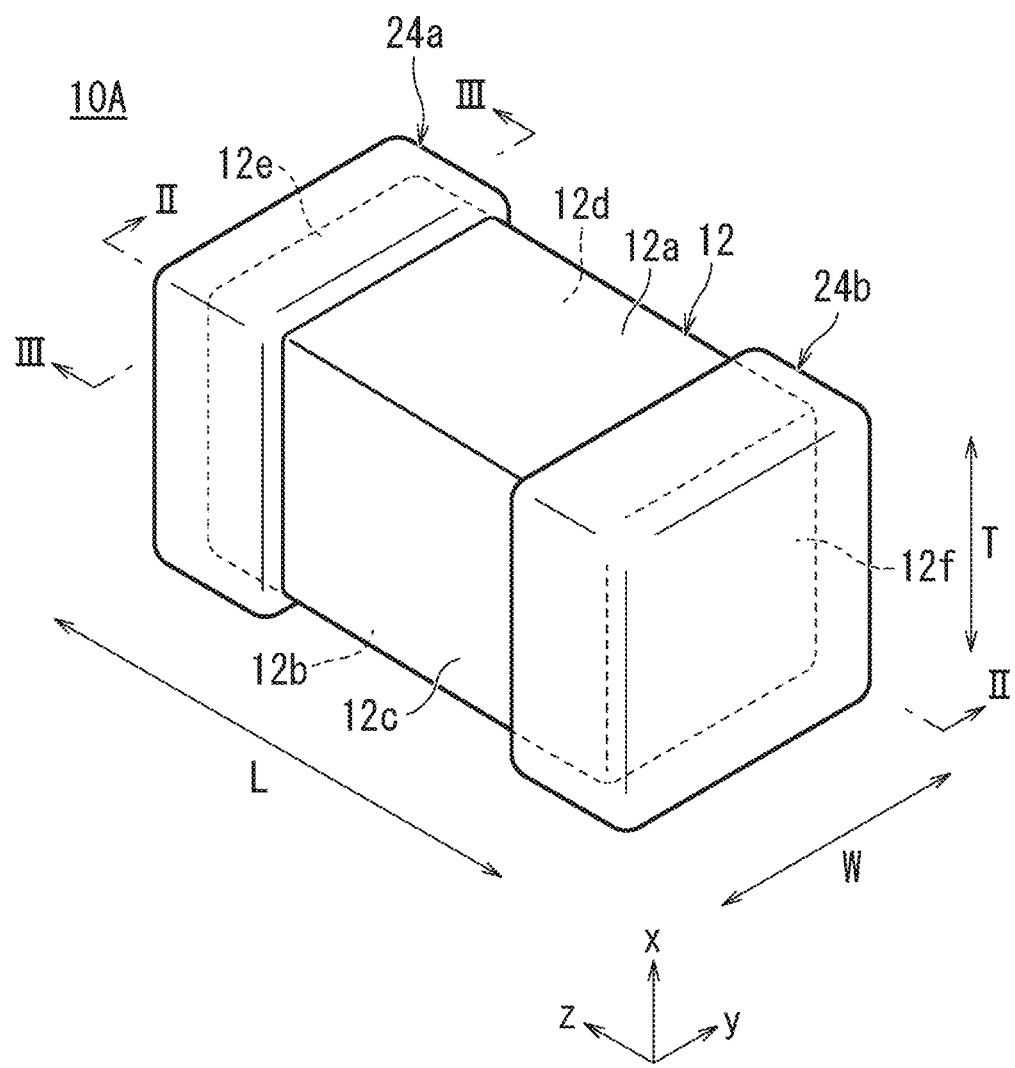
FIG. 1 is an outside perspective view of a multilayer ceramic capacitor according to a first preferred embodiment of the present invention.
Figure 2:
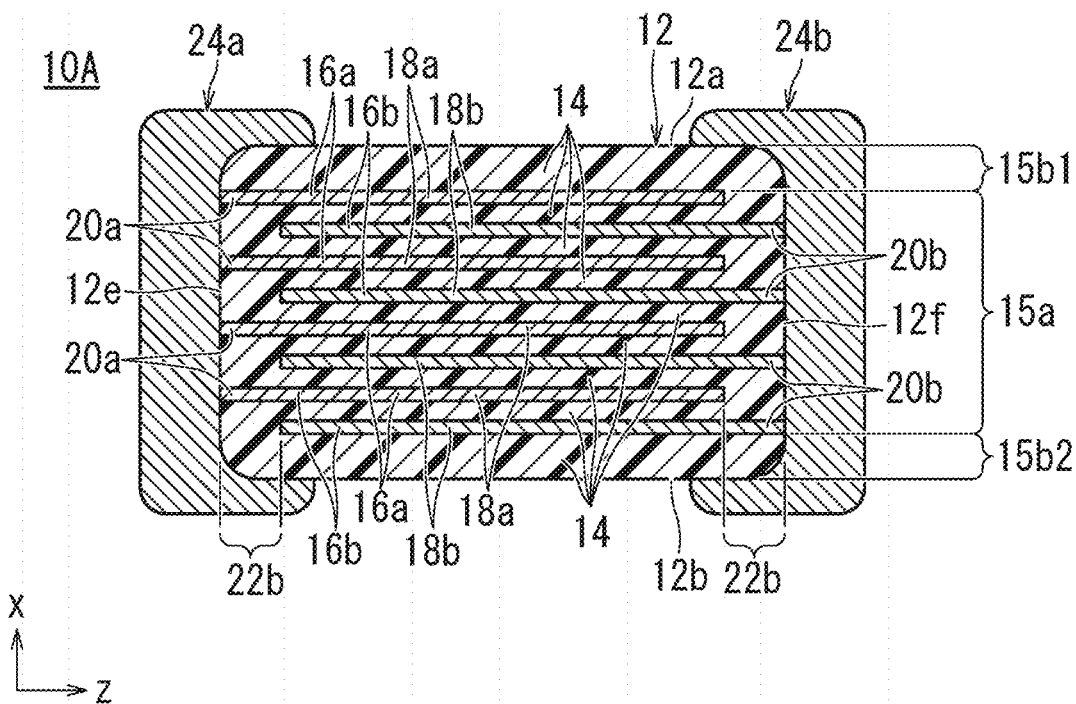
FIG. 2 is a cross-sectional view of a multilayer ceramic capacitor according to the first preferred embodiment of the present invention, taken along line II-II of FIG. 1.
Figure 3:
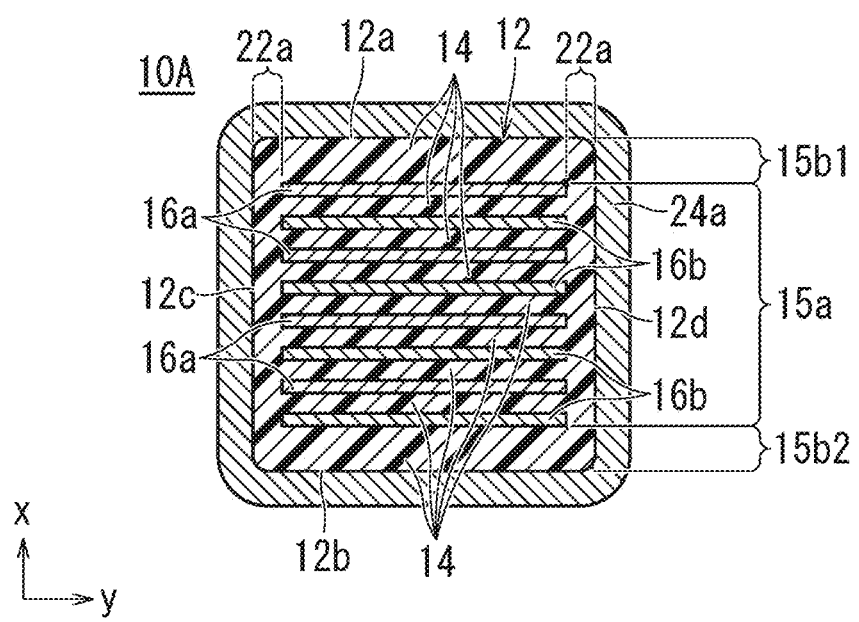
FIG. 3 is a cross-sectional view of a multilayer ceramic capacitor according to the first preferred embodiment of the present invention, taken along line III-III of FIG. 1.
Figure 4:
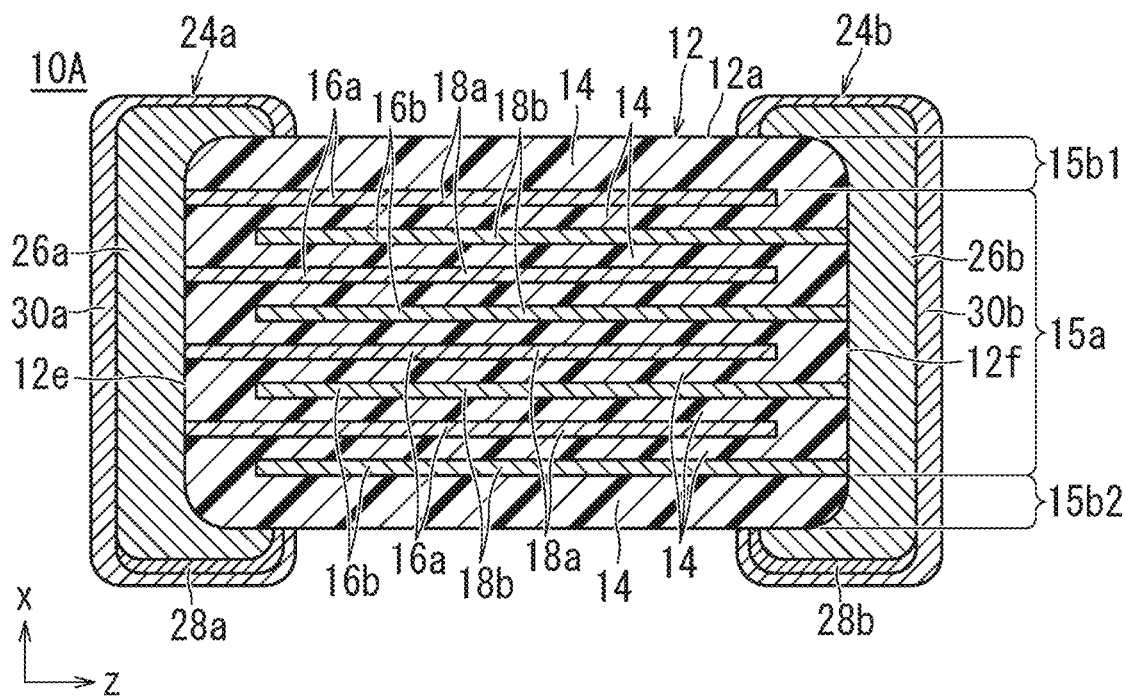
FIG. 4 is a schematic cross-sectional view of FIG. 2.
Figure 5:
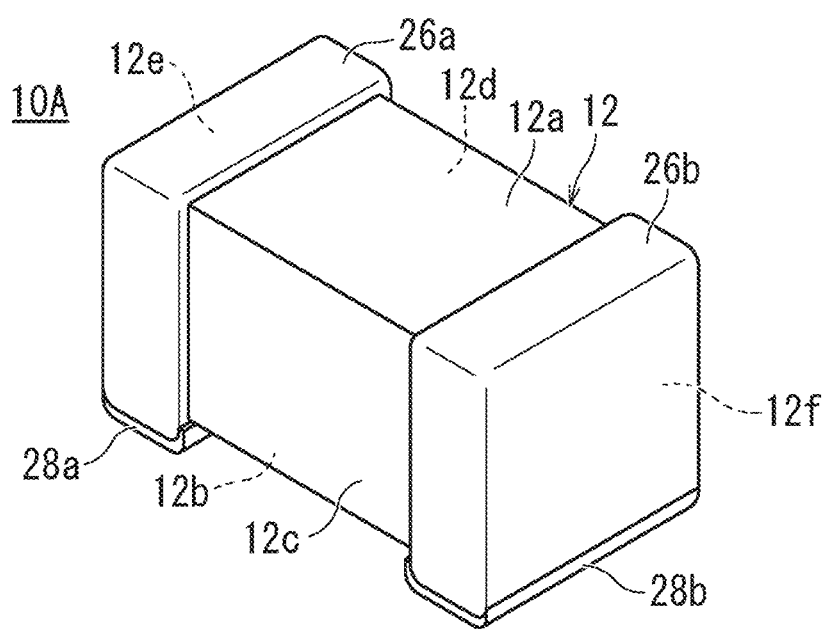
FIG. 5 is an outside perspective view showing a multilayer ceramic capacitor before the formation of a plating layer of external electrodes.

FIG. 1 is an outside perspective view showing a multilayer ceramic capacitor according to a first preferred embodiment of the present invention. FIG. 2 is a cross-sectional view taken along line II-II of FIG. 1, and FIG. 3 is a cross-sectional view taken along line III-III of FIG. 1. FIG. 4 is a schematic cross-sectional view of FIG. 2. FIG. 5 is an outside perspective view showing a multilayer ceramic capacitor before the formation of a plating layer of external electrodes.

A multilayer ceramic capacitor 10A includes a rectangular or substantially rectangular parallelepiped stacked body 12 and two external electrodes 24.

(A) Stacked Body

Stacked body 12 includes a plurality of ceramic layers and a plurality of internal electrode layers 16 which are stacked. Further, stacked body 12 includes a first main surface 12a and a second main surface 12b opposite to each other in stacking direction x, a first lateral surface 12c and a second lateral surface 12d opposite to each other in width direction y orthogonal to or substantially orthogonal to stacking direction x, and a first end surface 12e and a second end surface 12f opposite to each other in length direction z orthogonal to or substantially orthogonal to stacking direction x and width direction y. Stacked body 12 may have any suitable dimensions. Note that the dimension of stacked body 12 in length direction z is not necessarily greater than the dimension in width direction y.

The corners and ridge lines of stacked body 12 are preferably rounded. Each corner refers to an intersection of adjacent three planes of stacked body 12, and each ridge line refers to an intersection of adjacent two planes of stacked body 12. First and second main surfaces 12a, 12b, first and second lateral surfaces 12c, 12d, and first and second end surfaces 12e, 12f may have asperity, in part or in whole.

(i) Ceramic Layer

As shown in FIGS. 2 and 3, stacked body 12 includes an effective layer portion 15a, a first outer layer portion 15b1, and a second outer layer portion 15b2. Effective layer portion 15a is a portion in which a plurality of internal electrode layers 16 face each other in stacking direction x, i.e., in the direction of a line connecting first and second main surfaces 12a, 12b. First outer layer portion 15b1 includes a plurality of ceramic layers 14 located between first main surface 12a and internal electrode layer 16 that is closest to first main surface 12a. Second outer layer portion 15b2 includes a plurality of ceramic layers 14 located between second main surface 12b and internal electrode layer 16 that is closest to second main surface 12b.

First outer layer portion 15b1, which is located adjacent to first main surface 12a of stacked body 12, includes a plurality of ceramic layers 14 located between first main surface 12a and internal electrode layer 16 that is closest to first main surface 12a.

Second outer layer portion 15b2, which is located adjacent to second main surface 12b of stacked body 12, includes a plurality of ceramic layers 14 located between second main surface 12b and internal electrode layer 16 that is closest to second main surface 12b.

Effective layer portion 15a is the region sandwiched between first outer layer portion 15b1 and second outer layer portion 15b2.

The dimensions of stacked body 12 are preferably, but are not limited to, not less than about 0.2 mm and not more than about 10.0 mm in length direction z, not less than about 0.1 mm and not more than about 10.0 mm in width direction y, and not less than about 0.1 mm and not more than about 5.0 mm in height direction x, for example.

The number of stacked ceramic layers 14 is preferably, but is not limited to, not less than about 15 and not more than about 200, for example.

Ceramic layers 14 may be made of, for example, a dielectric material. The dielectric material may be, for example, a dielectric ceramic containing $BaTiO_3$, $CaTiO_3$, $SrTiO_3$, or $CaZrO_3$ as a primary component. With any of these dielectric materials contained as a primary component, secondary components, less in content than the primary component, may be added in accordance with the desired characteristics of stacked body 12. Examples of the secondary components include Mn compounds, Fe compounds, Cr compounds, Co compounds, and Ni compounds.

If piezoelectric ceramic material is used for ceramic layers 14, the multilayer ceramic electronic component defines and functions as a piezoelectric component. Specific examples of the piezoelectric ceramic material include lead zirconate titanate (PZT) ceramic material.

If semiconductor ceramic material is used for ceramic layers 14, the multilayer ceramic electronic component defines and functions as a thermistor. Specific examples of the semiconductor ceramic material include spinel ceramic material.

If magnetic ceramic material is used for ceramic layers 14, the multilayer ceramic electronic component defines and functions as an inductor. If the multilayer ceramic electronic component defines and functions as an inductor, internal electrode layers 16 define a coiled conductor. Specific examples of the magnetic ceramic material include ferrite ceramic material.

Each ceramic layer 14, after being fired, preferably has a thickness of not less than about 0.5 μm and not more than about 10 μm, for example.

(ii) Internal Electrode Layers

Stacked body 12 includes a plurality of first internal electrode layers 16a and a plurality of second internal electrode layers 16b, which are, for example, rectangular or substantially rectangular, as a plurality of internal electrode layers 16. The corners of the rectangle may be rounded or may be tapered or inclined. The plurality of first internal electrode layers 16a and the plurality of second internal electrode layers 16b are embedded such that they are alternated and equally or substantially equally spaced, with ceramic layers 14 being interposed therebetween, along stacking direction x of stacked body 12.

First internal electrode layers 16a include first facing electrode portions 18a and first leading electrode portions 20a. First facing electrode portions 18a face second internal electrode layers 16b. First leading electrode portions 20a are located at one end of first internal electrode layers 16a and lead from facing electrode portions 18a to first end surface 12e of stacked body 12. The end of each first leading electrode portion 20a is led to and exposed at first end surface 12e.

Second internal electrode layers 16b include second facing electrode portions 18b and second leading electrode portions 20b. Second facing electrode portions 18b face first internal electrode layers 16a. Second leading electrode portions 20b are located at one end of second internal electrode layers 16b and lead from second facing electrode portions 18b to second end surface 12f of stacked body 12. The end of each second leading electrode portion 20b is led to and exposed at second end surface 12f.

First and second facing electrode portions 18a, 18b may have the same width as, or may be larger or smaller in width than, first and second leading electrode portions 20a, 20b.

Figure 20A:
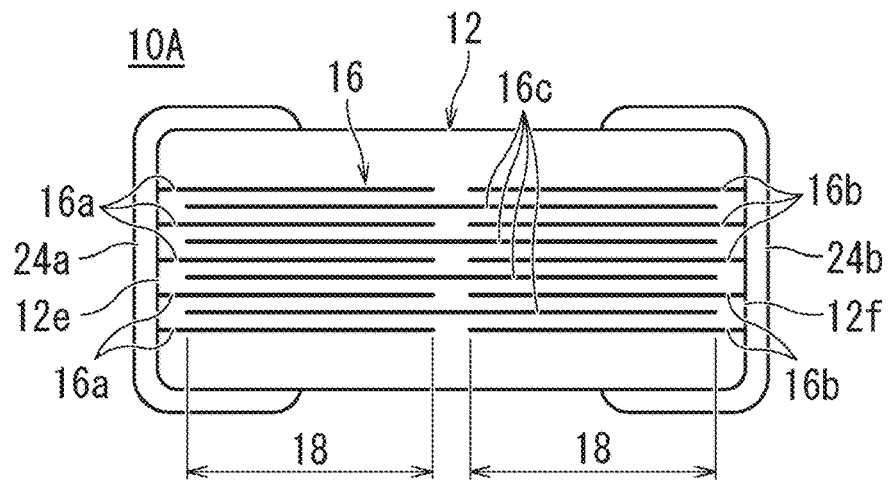
FIG. 20A is a schematic cross-sectional view showing a structure in which the facing electrode portions of the internal electrode layers of a multilayer ceramic capacitor are divided into two portions.
Figure 20B:
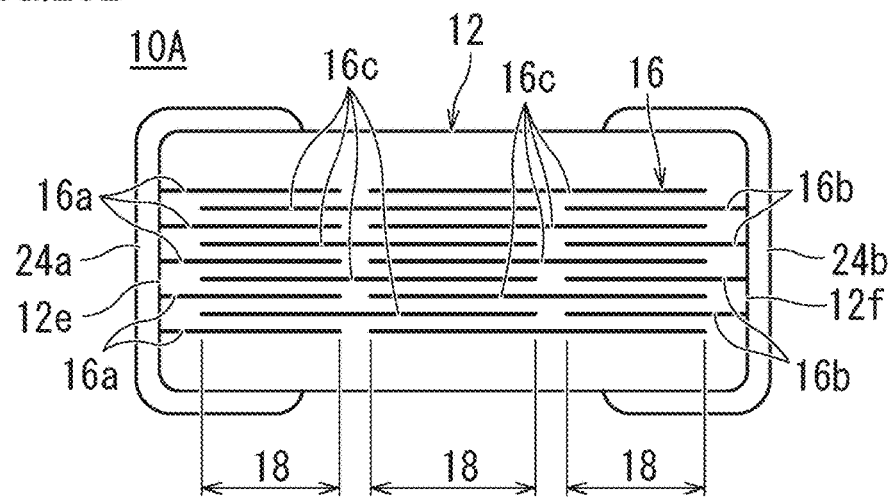
FIG. 20B is a schematic cross-sectional view showing a structure in which the facing electrode portions of the internal electrode layers of a multilayer ceramic capacitor are divided into three portions.
Figure 20C:
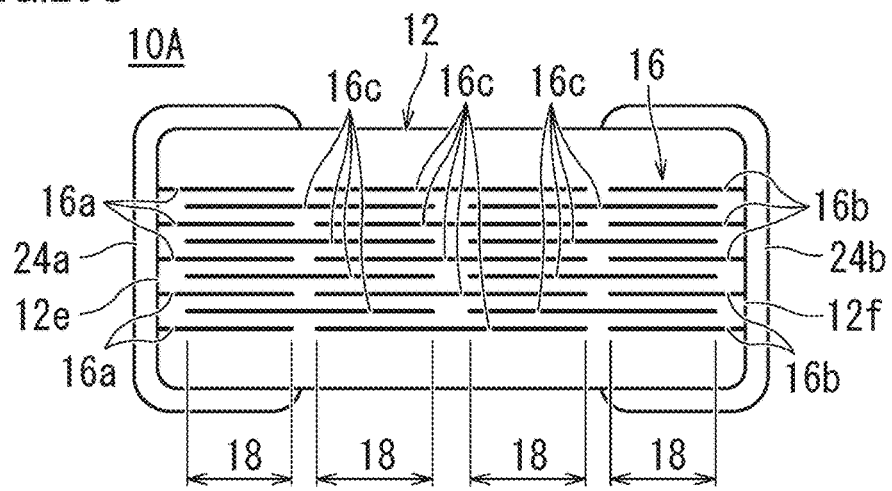
FIG. 20C is a schematic cross-sectional view showing a structure in which the facing electrode portions of the internal electrode layers of a multilayer ceramic capacitor are divided into four portions.

As shown in FIGS. 20A to 20C, internal electrode layers 16 may include not only first and second internal electrode layers 16a, 16b but also floating internal electrode layers 16c that are led to neither first end surface 12e nor second end surface 12f. With floating internal electrode layers 16c, facing electrode portions 18 may be divided into a plurality of portions. For example, facing electrode portions 18 may include two portions as shown in FIG. 20A, three portions as shown in FIG. 20B, or four portions as shown in FIG. 20C. More than four portions are also possible. With such a structure in which facing electrode portions 18 are divided into a plurality of portions, a plurality of capacitor components are provided between internal electrode layers 16a, 16b, 16c that face each other, with these capacitor components being connected in series. This reduces the voltage applied to each capacitor component, thus enabling multilayer ceramic capacitor 10A to withstand a higher voltage.

Stacked body 12 includes lateral portions ("W gaps") 22a between first lateral surface 12c and one end of first and second facing electrode portions 18a, 18b in width direction y, and between second lateral surface 12d and the other end of first and second facing electrode portions 18a, 18b in width direction y. Further, stacked body 12 includes end portions ("L gaps") 22b between second end surface 12f and the end of first internal electrode layers 16a opposite to first leading electrode portions 20a, and between first end surface 12e and the end of second internal electrode layers 16b opposite to second leading electrode portions 20b.

Internal electrode layers 16 may be made of an appropriate conductive material, such as a metal (e.g., Ni, Cu, Ag, Pd, or Au) or an alloy containing at least one of these metals (e.g., Ag—Pd alloy). Internal electrode layers 16 may further contain dielectric particles having the same or substantially the same composition as the ceramic contained in ceramic layers 14.

Each internal electrode layer 16 preferably has a thickness of not less than about 0.2 µm and not more than about 2.0 µm, for example. The number of internal electrode layers 16 is preferably not less than about 15 and not more than about 200, for example.

(B) External Electrodes

External electrodes 24 are disposed on first and second end surfaces 12e, 12f of stacked body 12. External electrodes 24 include a first external electrode 24a and a second external electrode 24b. Each of first and second external electrodes 24a, 24b includes an underlying electrode layer 26 connected to internal electrode layers 16, a resin layer 28 provided on underlying electrode layer 26, and a plating layer 30 provided on resin layer 28.

First external electrode 24a covers first end surface 12e of stacked body 12, extends from first end surface 12e, and covers a portion of each of first main surface 12a, second main surface 12b, first lateral surface 12c, and second lateral surface 12d. In this case, first external electrode 24a is electrically connected to first leading electrode portions 20a of first internal electrode layers 16a.

Second external electrode 24b covers second end surface 12f of stacked body 12, extends from second end surface 12f, and covers a portion of each of first main surface 12a, second main surface 12b, first lateral surface 12c, and second lateral surface 12d. In this case, second external electrode 24b is electrically connected to second leading electrode portions 20b of second internal electrode layer 16b.

In stacked body 12, first facing electrode portions 18a of first internal electrode layers 16a and second facing electrode portions 18b of second internal electrode layers 16b face each other, with ceramic layers 14 being interposed therebetween, thus generating capacitance. This provides a capacitance between first external electrode 24a, to which first internal electrode layers 16a are connected, and second external electrode 24b, to which second internal electrode layers 16b are connected. The characteristics of capacitor is thus provided.

First external electrode 24a includes a first underlying electrode layer 26a, a first resin layer 28a, and a first plating layer 30a. First underlying electrode layer 26a contains a conductive metal and a glass component. First resin layer 28a contains a thermosetting resin and no metal component.

Second external electrode 24b includes a second underlying electrode layer 26b, a second resin layer 28b, and a second plating layer 30b. Second underlying electrode layer 26b contains a conductive metal and a glass component. Second resin layer 28b contains a thermosetting resin and no metal component.

(i) Underlying Electrode Layer

Underlying electrode layer 26 includes first and second underlying electrode layers 26a, 26b.

First underlying electrode layer 26a covers first end surface 12e of stacked body 12, extends from first end surface 12e, and covers a portion of each of first main surface 12a, second main surface 12b, first lateral surface 12c, and second lateral surface 12d.

Second underlying electrode layer 26b covers second end surface 12f of stacked body 12, extends from second end surface 12f, and covers a portion of each of first main surface 12a, second main surface 12b, first lateral surface 12c, and second lateral surface 12d.

Underlying electrode layer 26 contains a conductive metal and a glass component. The metal in underlying electrode layer 26 preferably includes at least one selected from Cu, Ni, Ag, Pb, Pd, Ag—Pb alloy, Ag—Pd alloy, and Au, for example. The glass in underlying electrode layer 26 preferably includes at least one selected from B, Si, Ba, Mg, Al, and Li, for example.

Underlying electrode layer 26 may include a plurality of layers. Underlying electrode layer 26 is produced by applying a conductive paste containing glass and metal to stacked body 12 and then baking it. The baking may be performed simultaneously with or after the firing of ceramic layers 14 and internal electrode layers 16.

Underlying electrode layer 26 preferably has a thickness of, for example, not less than about 10 µm and not more than about 150 µm on each of first and second end surfaces 12e, 12f, at its center. With such a thickness, solder will come into contact with the plating of external electrode 24 at an acute angle. Thus, when a stress is applied from the solder to the plating during thermal shock cycling, a larger proportion of the stress is a component parallel or substantially parallel to the plating plane. This can reduce the occurrence of solder cracking. Underlying electrode layer 26 preferably has a thickness of, for example, not less than about 5 µm and not more than about 50 µm on each of first main surface 12a, second main surface 12b, first lateral surface 12c, and second lateral surface 12d, at its center or approximate center.

Each external electrode 24 may include only a plating layer, with no underlying electrode layer 26. A structure including a plating layer with no underlying electrode layer will now be described.

For each of first and second external electrodes 24a, 24b, a plating layer may be directly provided on the surface of stacked body 12, with no underlying electrode layer. That is, multilayer ceramic capacitor 10A may include a plating layer electrically connected to first internal electrode layers 16a or second internal electrode layers 16b. In this case, a catalyst may be applied to the surface of stacked body 12 as a pretreatment before the plating layer is provided.

The plating layer preferably includes a lower plating electrode provided on the surface of stacked body 12, and an upper plating electrode provided on the surface of the lower plating electrode.

Each of the lower and upper plating electrodes preferably contains at least one metal selected from Cu, Ni, Sn, Pb, Au, Ag, Pd, Bi, and Zn; or an alloy containing any of these metals, for example.

The lower plating electrode is preferably made of, for example, Ni, which can define and function as a barrier against solder. The upper plating electrode is preferably made of, for example, Sn or Au, which has good solder wettability. If first and second internal electrode layers 16a, 16b are made of Ni for example, the lower plating electrode is preferably made of Cu, which has good bondability to Ni. The upper plating electrode is optional, that is, each of first and second external electrodes 24a, 24b may include only of the lower plating electrode.

The plating layer may include the upper plating electrode as an outermost layer, or may include an additional plating electrode on the surface of the upper plating electrode.

With no underlying electrode layer, each plating layer preferably has a thickness of not less than about 1 µm and not more than about 15 µm, for example. The plating layer is preferably free from glass. The percentage of metal in the plating layer per unit volume is preferably about 99 vol % or more, for example.

(ii) Resin Layer

Resin layer 28 includes first resin layer 28a and second resin layer 28b.

First resin layer 28a covers first underlying electrode layer 26a on second main surface 12b adjacent to first end surface 12e.

Second resin layer 28b covers second underlying electrode layer 26b on second main surface 12b adjacent to second end surface 12f.

Resin layer 28 contains a thermosetting resin and no metal component. As a specific example of the thermosetting resin contained in resin layer 28, any of various publicly known thermosetting resins may be used, such as epoxy resins, phenolic resins, urethane resins, silicone resins, and polyimide resins. Among these, epoxy resin is one of the most preferable resins due to its excellent heat resistance, moisture resistance, and adhesion. Resin layer 28 preferably contains a curing agent as well as thermosetting resin. If an epoxy resin is used as the base resin, the curing agent may be any of various publicly known compounds, such as, for example, phenolic compounds, amine compounds, acid anhydride compounds, and imidazole compounds.

While the resin used for resin layer 28 is preferably a thermosetting resin, other types of resin may also be used, such as a room-temperature curable resin, a photo-curable resin, or an electron beam curable resin, for example.

Resin layer 28, which contains a thermosetting resin, is more flexible than, for example, plating layer 30 and underlying electrode layer 26. Accordingly, even if multilayer ceramic capacitor 10A is subjected to stresses due to the drop impact or bending stresses due to the thermal expansion and contraction of a mounting board caused by thermal cycling, resin layer 28 can define and function as a buffer layer, thus preventing cracking of multilayer ceramic capacitor 10A.

Resin layer 28 preferably has a thickness of, but is not limited to, not less than about 10 μm and not more than about 30 μm for example.

(iii) Plating Layer

Plating layer 30 includes first and second plating layers 30a, 30b.

First plating layer 30a covers the surface of first resin layer 28a and a portion of the surface of first underlying electrode layer 26a that is not covered with first resin layer 28a. Thus, first plating layer 30a is directly in contact with a portion of first underlying electrode layer 26a that is exposed through first resin layer 28a. Specifically, first plating layer 30a covers first underlying electrode layer 26a located on first main surface 12a, on first lateral surface 12c, on second lateral surface 12d, and on first end surface 12e; and covers first resin layer 28a located on second main surface 12b.

Second plating layer 30b covers the surface of second resin layer 28b and a portion of the surface of second underlying electrode layer 26b that is not covered with second resin layer 28b. Thus, second plating layer 30b is directly in contact with a part of second underlying electrode layer 26b that is exposed through second resin layer 28b. Specifically, second plating layer 30b covers second underlying electrode layer 26b located on first main surface 12a, on first lateral surface 12c, on second lateral surface 12d, and on second end surface 12f; and covers second resin layer 28b located on second main surface 12b.

Thus, in first external electrode 24a, first plating layer 30a is directly in contact with first underlying electrode layer 26a, with no high-resistivity first resin layer 28a interposed therebetween, on first main surface 12a, first lateral surface 12c, second lateral surface 12d, and first end surface 12e. In second external electrode 24b, second plating layer 30b is directly in contact with second underlying electrode layer 26b, with no high-resistivity second resin layer 28b interposed therebetween, on first main surface 12a, first lateral surface 12c, second lateral surface 12d, and second end surface 12f. Thus, first and second external electrodes 24a, 24b enable a reduced equivalent series resistance (ESR).

The metallic material of first and second plating layers 30a, 30b preferably includes at least one selected from Cu, Ni, Ag, Pd, Ag—Pd alloy, and Au, for example.

Each of first and second plating layers 30a, 30b may include a plurality of layers. First plating layer 30a preferably has a double-layer structure including a Ni plating layer and a Sn plating layer, for example. Second plating layer 30b also has a double-layer structure preferably including a Ni plating layer and a Sn plating layer, for example. The Ni plating layer can prevent resin layer 28 and underlying electrode layer 26 from being eroded by the mounting solder when multilayer ceramic capacitor 10A is mounted. The Sn plating layer can improve the solder wettability when multilayer ceramic capacitor 10A is mounted, thus enabling easy mounting of multilayer ceramic capacitor 10A. Each plating layer 30 preferably has a thickness of not less than about 1 μm and not more than about 15 μm, for example.

Where the dimension of multilayer ceramic capacitor 10A in length direction z is denoted by L dimension, L dimension is preferably not less than about 0.2 mm and not more than about 10 mm, for example. Where the dimension of multilayer ceramic capacitor 10A in width direction y is denoted by W dimension, W dimension is preferably not less than about 0.1 mm and not more than about 10 mm, for example. Where the dimension of multilayer ceramic capacitor 10A in stacking direction x is denoted by T dimension, T dimension is preferably not less than about 0.1 mm and not more than about 5 mm, for example.

In multilayer ceramic capacitor 10A shown in FIG. 1, first external electrode 24a includes first resin layer 28a containing a resin and no metal component, and second external electrode 24b includes second resin layer 28b containing a resin and no metal component. Therefore, multilayer ceramic capacitor 10A can reduce the ESR as compared to a multilayer ceramic capacitor including, for example, an epoxy thermosetting resin layer containing a metal component. This is because the multilayer ceramic capacitor according to the present preferred embodiment contains no metal component and thus includes no current-carrying path, thereby reducing the ESR. Whereas, in a conventional multilayer ceramic capacitor which contains a metal component, the physical contact of the metal component providing a current-carrying path, thereby increasing the resistance and therefore increasing the ESR.

Further, even when the multilayer ceramic electronic component is subjected to stresses due to the drop impact or bending stresses due to the thermal expansion and contraction of a mounting board caused by thermal cycling, resin layer 28 as described above can release the stresses applied to the mounting board (the deformation of the mounting board), thus reducing or preventing cracking of the multilayer ceramic electronic component.

(2) Method for Manufacturing Multilayer Ceramic Capacitor

Description will now be provided of one preferred embodiment of a method for manufacturing multilayer ceramic capacitor 10A in the first preferred embodiment having the structure as described above.

First, ceramic green sheets for producing ceramic layers 14, an internal-electrode conductive paste for producing internal electrode layers 16, and an external-electrode conductive paste for producing underlying electrode layer 26 of external electrodes 24 are prepared. The ceramic green sheets, the internal-electrode conductive paste, and the external-electrode conductive paste contain binders and solvents, which may be any of publicly known organic binders and organic solvents.

The ceramic green sheets are printed with the internal-electrode conductive paste in a predetermined pattern, so that an internal electrode pattern is formed on the ceramic green sheets. Any of publicly known methods may be used for printing the internal-electrode conductive paste, such as screen printing or gravure printing, for example.

Then, a predetermined number of ceramic green sheets for outer layer with no internal electrode pattern are stacked. On these sheets, ceramic green sheets with the internal electrode pattern printed thereon are stacked one after another. Further, a predetermined number of ceramic green sheets for outer layer are stacked. Thus, a mother stacked body is produced. If necessary, the mother stacked body may be compressed in stacking direction x by, for example, hydrostatic pressing.

Then, the mother stacked body is cut into pieces having a predetermined shape and size, thus producing raw stacked body chips. At this time, the ridge lines and corners of each raw stacked body chip may be rounded by, for example, barrel polishing. Then, each raw stacked body chip that has been cut out is fired, thus producing stacked body 12. The temperature of firing the raw stacked body chip is preferably not less than about 900° C. and not more than about 1400° C., for example, depending on the materials of the ceramic and internal-electrode conductive paste.

Next, first and second external electrodes 24a, 24b are formed respectively on first and second end surfaces 12e, 12f of stacked body 12. Specifically, after stacked body 12 is fired, a paste for underlying electrode layers containing a conductive metal and a glass component is applied by, for example, dipping to first and second end surfaces 12e, 12f of stacked body 12, and is then baked. Thus, first underlying electrode layer 26a of first external electrode 24a and second underlying electrode layer 26b of second external electrode 24b are formed. The baking temperature is preferably not less than about 700° C. and not more than about 900° C., for example.

Instead of underlying electrode layer 26, an underlying plating layer may be formed on first and second end surfaces 12e, 12f of stacked body 12. In this case, first and second end surfaces 12e, 12f of stacked body 12 are plated so that an underlying plating layer is formed on the portion where leading electrode portions 20 of internal electrode layers 16 are exposed. Any one of electrolytic plating and electroless plating may be used for plating. However, electrolytic plating is typically preferred, since electroless plating would require a pretreatment with a catalyst to increase the rate of plating deposition and thus complicates the process. As a plating technique, for example, barrel plating is preferably used. If necessary, the underlying plating layer has a double-layer structure including a lower plating and an upper plating.

Then, resin layer 28 is formed. Specifically, a resin-layer paste that contains a thermosetting resin and no metal component is applied, so that the resin-layer paste covers first underlying electrode layer 26a located on second main surface 12b adjacent to first end surface 12e. Thus, first resin layer 28a is formed. Similarly, a resin-layer paste that contains a thermosetting resin and no metal component is applied, so that the resin-layer paste covers second underlying electrode layer 26b located on second main surface 12b adjacent to second end surface 12f. Thus, second resin layer 28b is formed.

In order to form first and second resin layers 28a, 28b only on second main surface 12b, the following example of a method may be used. First, stacked bodies 12 are arranged on an array plate, with their second main surface 12b facing upward. Then, second main surface 12b is masked, so that only a portion where a resin layer is to be formed is exposed. Then, a resin-layer paste is applied to second main surface 12b by screen printing, for example. After that, the masking is removed.

As an alternative method to form first and second resin layers 28a, 28b only on second main surface 12b, the following example of a method may also be used. First, a resin-layer paste is applied by, for example, dipping, not only to second main surface 12b but also to other surfaces. Then, a superfluous resin-layer paste on the surfaces other than second main surface 12b is removed.

The resin-layer paste is then heat-treated at, for example, a temperature of not less than about 250° C. and not more than about 550° C. so that the thermosetting resin can be thermally cured, thus forming resin layer 28. The heat treatment is performed preferably under a $N_2$ atmosphere, for example. In order to prevent the scattering of thermosetting resin and the oxidation of metallic powder, the oxygen concentration is preferably about 100 ppm or less, for example.

Next, plating layer 30 is formed so that it covers the surface of resin layer 28 and covers a portion of the surface of underlying electrode layer 26 that is not covered with resin layer 28. Plating layer 30 has a double-layer structure including a Ni plating layer and a Sn plating layer on the Ni plating layer. The Ni plating layer and the Sn plating layer are formed in sequence by, for example, barrel plating.

Through the processes described above, multilayer ceramic capacitor 10A is manufactured.

2. Second Preferred Embodiment

Figure 6:
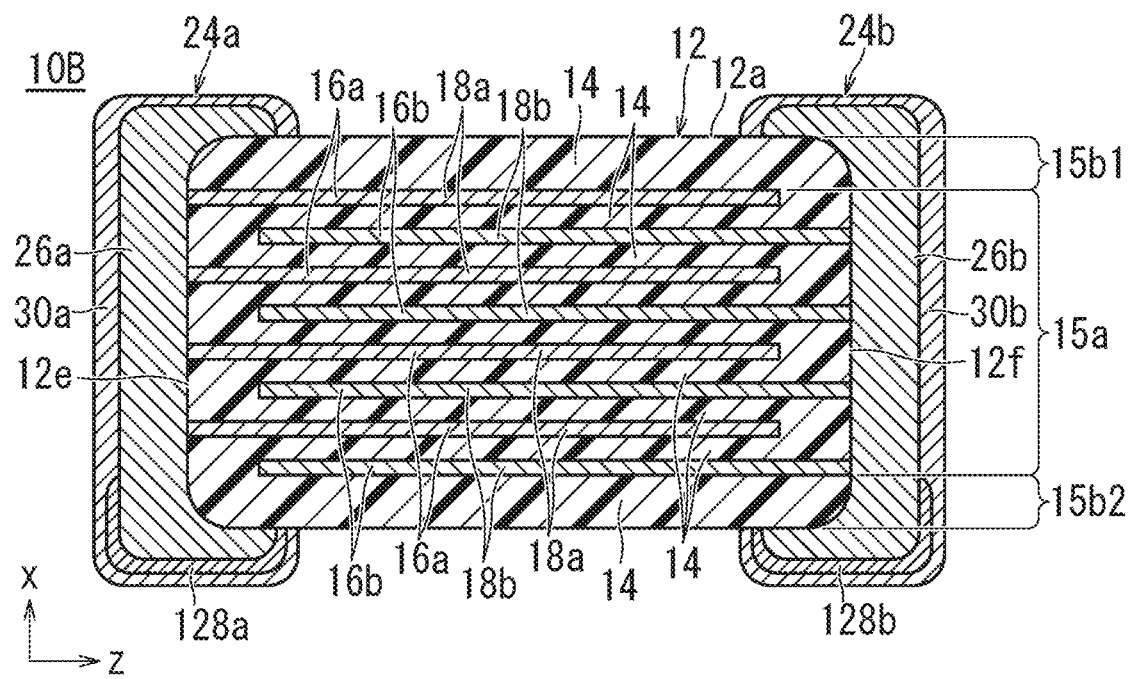
FIG. 6 is a schematic cross-sectional view showing a multilayer ceramic capacitor according to a second preferred embodiment of the present invention.
Figure 7:
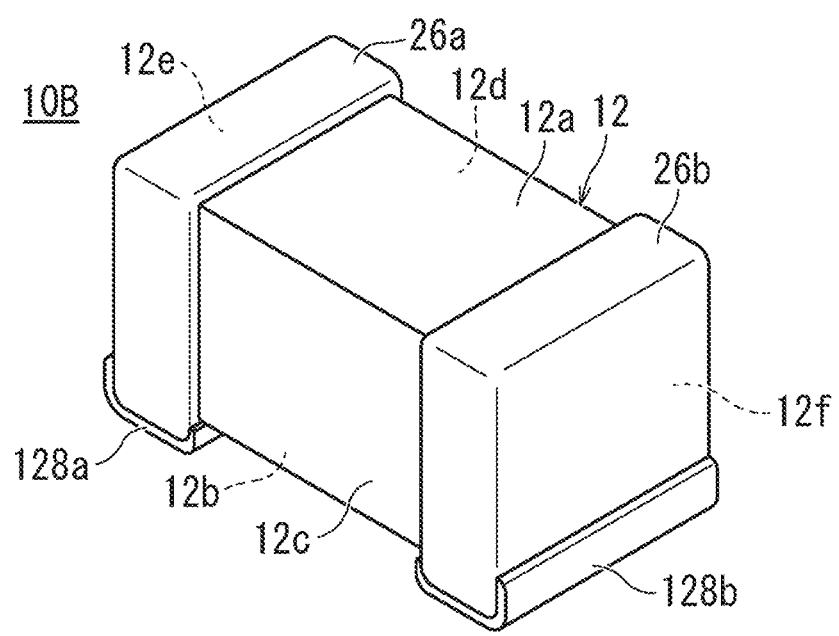
FIG. 7 is an outside perspective view showing the multilayer ceramic capacitor of FIG. 6 in a state before the formation of a plating layer of external electrodes.

FIG. 6 is a schematic cross-sectional view showing a multilayer ceramic capacitor according to a second preferred embodiment of the present invention. FIG. 7 is an outside perspective view showing the multilayer ceramic capacitor of FIG. 6 in a state before the formation of a plating layer of external electrodes.

A multilayer ceramic capacitor 10B according to the second preferred embodiment is similar in configuration to multilayer ceramic capacitor 10A according to the first preferred embodiment, except that resin layer 28 in the first preferred embodiment is replaced by a resin layer 128. Here, redundant description is omitted.

Resin layer 128 includes a first resin layer 128a and a second resin layer 128b.

First resin layer 128a covers a portion of first underlying electrode layer 26a located on second main surface 12b adjacent to first end surface 12e and extending from second main surface 12b to first end surface 12e.

Second resin layer 128b covers a portion of second underlying electrode layer 26b located on second main surface 12b adjacent to second end surface 12f and extending from second main surface 12b to second end surface 12f.

Accordingly, even if multilayer ceramic capacitor 10B is subjected to stresses due to the drop impact or bending stresses due to the thermal expansion and contraction of a mounting board caused by thermal cycling, resin layer 128 can define and function as a buffer layer, thus reducing or preventing cracking of multilayer ceramic capacitor 10B.

Further, first plating layer 30a covers first underlying electrode layer 26a located on first main surface 12a, on first lateral surface 12c, on second lateral surface 12d, and on first end surface 12e; and covers first resin layer 128a located on second main surface 12b and on first end surface 12e.

Second plating layer 30b covers second underlying electrode layer 26b located on first main surface 12a, on first lateral surface 12c, on second lateral surface 12d, and on second end surface 12f; and covers second resin layer 128b located on second main surface 12b and on second end surface 12f.

Thus, in first external electrode 24a, first plating layer 30a is directly in contact with first underlying electrode layer 26a, with no high-resistivity first resin layer 128a interposed therebetween, on first main surface 12a, first lateral surface 12c, second lateral surface 12d, and first end surface 12e. In second external electrode 24b, second plating layer 30b is directly in contact with second underlying electrode layer 26b, with no high-resistivity second resin layer 128b interposed therebetween, on first main surface 12a, first lateral surface 12c, second lateral surface 12d, and second end surface 12f. Thus, first and second external electrodes 24a, 24b enable a reduced equivalent series resistance (ESR).

In order to form first and second resin layers 128a, 128b only on a portion of second main surface 12b and on a portion of adjacent first and second end surfaces 12e, 12f, the following example of a method may be used. First, stacked bodies 12 are arranged on an array plate, with their second main surface 12b facing upward. Then, second main surface 12b is masked, so that only a portion where a resin layer is to be formed is exposed. Then, a resin-layer paste is applied to second main surface 12b by screen printing, for example. After that, the masking is removed. Similarly, a resin-layer paste is also applied to first and second end surfaces 12e, 12f by screen printing, for example.

As an alternative method to form first and second resin layers 128a, 128b only on a portion of second main surface 12b and on a portion of adjacent first and second end surfaces 12e, 12f, the following example of a method may also be used. First, a resin-layer paste is applied by, for example, dipping, not only to second main surface 12b and adjacent first and second end surfaces 12e, 12f but also to other surfaces. Then, a superfluous resin-layer paste on the surfaces other than second main surface 12b and adjacent first and second end surfaces 12e, 12f is removed.

3. Third Preferred Embodiment

Figure 8:
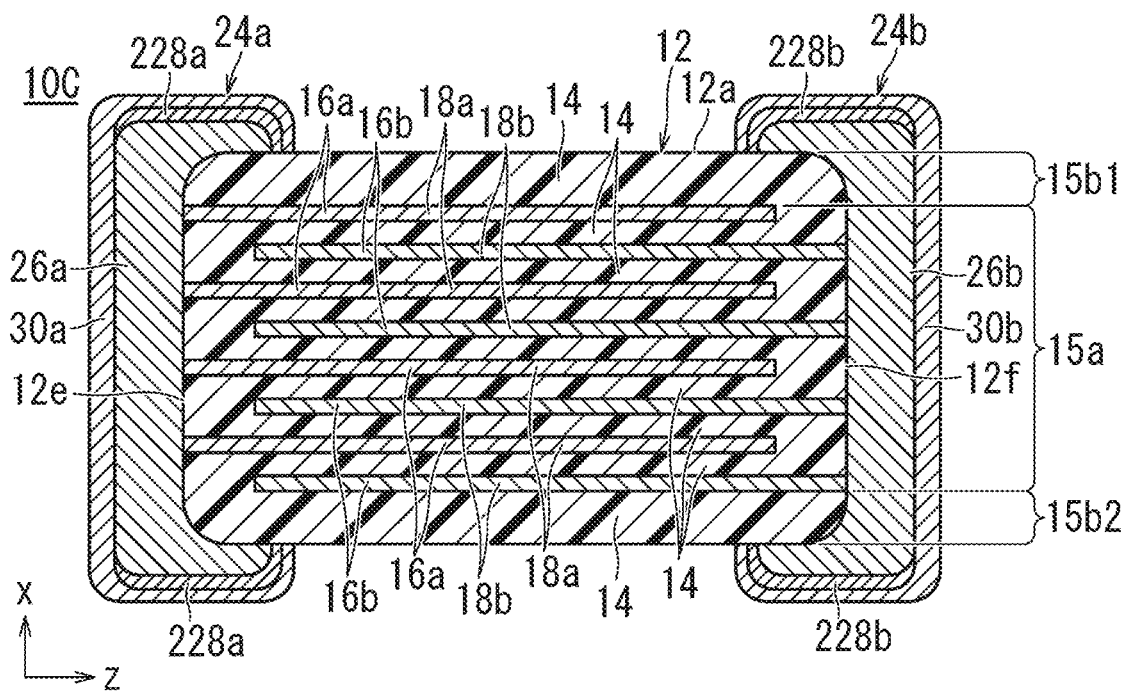
FIG. 8 is a schematic cross-sectional view showing a multilayer ceramic capacitor according to a third preferred embodiment of the present invention.
Figure 9:
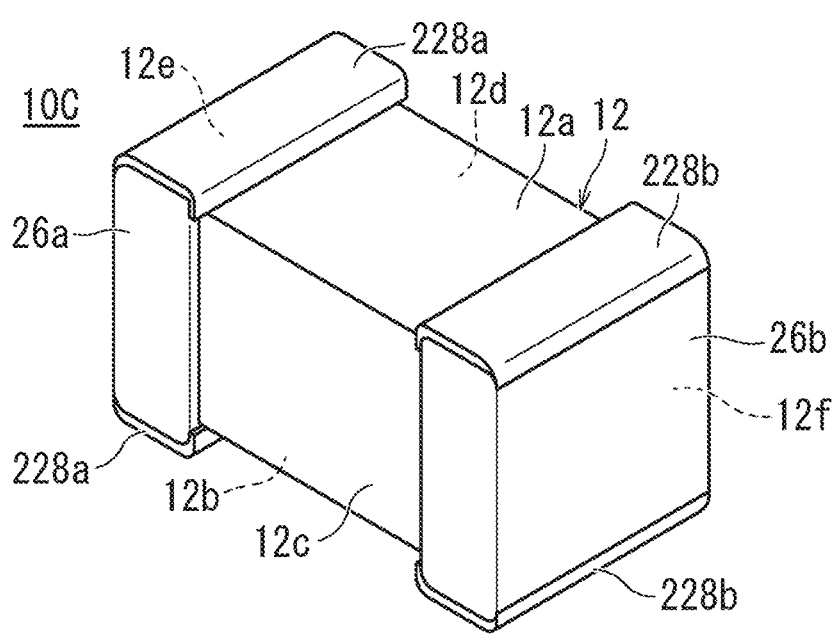
FIG. 9 is an outside perspective view showing the multilayer ceramic capacitor of FIG. 8 in a state before the formation of a plating layer of external electrodes.

FIG. 8 is a schematic cross-sectional view showing a multilayer ceramic capacitor according to a third preferred embodiment of the present invention. FIG. 9 is an outside perspective view showing the multilayer ceramic capacitor of FIG. 8 in a state before the formation of a plating layer of external electrodes.

A multilayer ceramic capacitor 10C according to the third preferred embodiment is similar in configuration to multilayer ceramic capacitor 10A according to the first preferred embodiment, except that resin layer 28 in the first preferred embodiment is replaced by a resin layer 228. Here, redundant description is omitted.

Resin layer 228 includes a first resin layer 228a and a second resin layer 228b.

First resin layer 228a covers first underlying electrode layer 26a on first main surface 12a adjacent to first end surface 12e and on second main surface 12b adjacent to first end surface 12e.

Second resin layer 228b covers second underlying electrode layer 26b on first main surface 12a adjacent to second end surface 12f and on second main surface 12b adjacent to second end surface 12f.

Accordingly, even if multilayer ceramic capacitor 10C is subjected to stresses due to the drop impact or bending stresses due to the thermal expansion and contraction of a mounting board caused by thermal cycling, resin layer 228 can define and function as a buffer layer, thus reducing or preventing cracking of multilayer ceramic capacitor 10C.

Further, both first and second main surfaces 12a, 12b can define and function as a mounting surface, which eliminates the need for distinction depending on the direction on an automatic taping machine.

First plating layer 30a covers first underlying electrode layer 26a located on first lateral surface 12c, on second lateral surface 12d, and on first end surface 12e; and covers first resin layer 228a located on first main surface 12a and on second main surface 12b.

Second plating layer 30b covers second underlying electrode layer 26b located on first lateral surface 12c, on second lateral surface 12d, and on second end surface 12f; and covers second resin layer 228b located on first main surface 12a and on second main surface 12b.

Thus, in first external electrode 24a, first plating layer 30a is directly in contact with first underlying electrode layer 26a, with no high-resistivity first resin layer 228a interposed therebetween, on first lateral surface 12c, second lateral surface 12d, and first end surface 12e. In second external electrode 24b, second plating layer 30b is directly in contact with second underlying electrode layer 26b, with no high-resistivity second resin layer 228b interposed therebetween, on first lateral surface 12c, second lateral surface 12d, and second end surface 12f. Thus, first and second external electrodes 24a, 24b enables a reduced equivalent series resistance (ESR).

In order to form first and second resin layers 228a, 228b only on first and second main surfaces 12a, 12b, the following example of a method may be used. First, stacked bodies 12 are arranged on an array plate, with their first main surface 12a facing upward. Then, first main surface 12a is masked, so that only a portion where a resin layer is to be formed is exposed. Then, a resin-layer paste is applied to first main surface 12a by screen printing, for example. After that, the masking is removed. Similarly, a resin-layer paste is also applied to second main surface 12b by screen printing, for example.

As an alternative method to form first and second resin layers 228a, 228b only on first and second main surfaces 12a, 12b, the following example of a method may also be used. First, a resin-layer paste is applied by, for example, dipping, not only to first and second main surfaces 12a, 12b but also to other surfaces. Then, a superfluous resin-layer paste on the surfaces other than first and second main surfaces 12a, 12b is removed.

4. Fourth Preferred Embodiment

Figure 10:
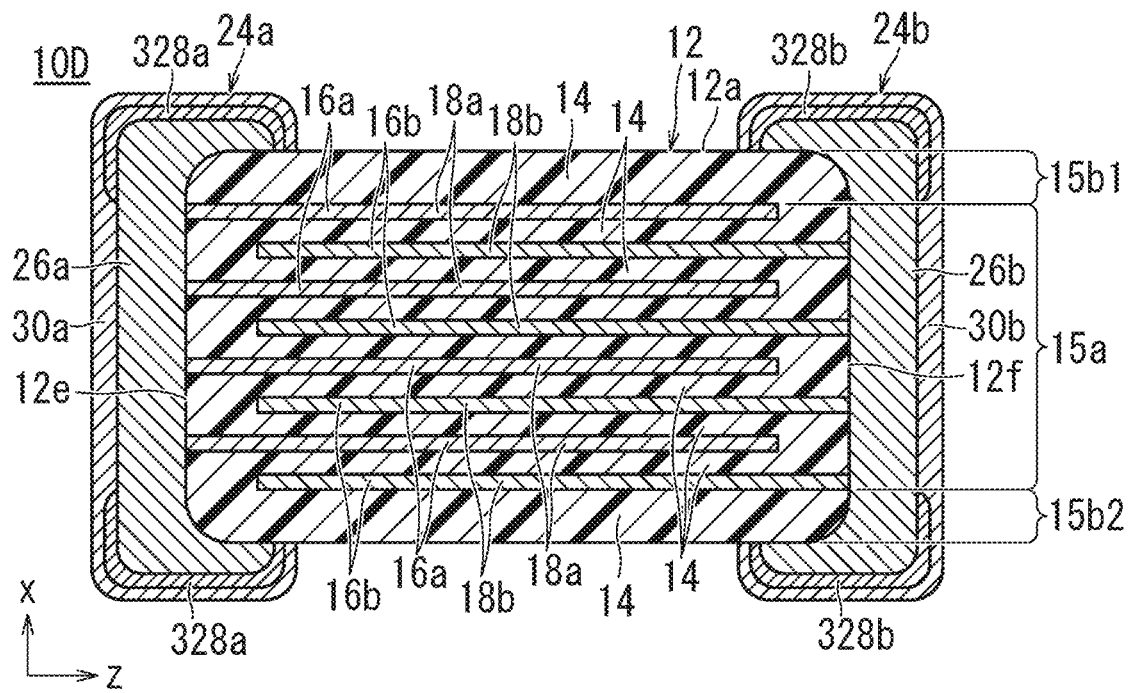
FIG. 10 is a schematic cross-sectional view showing a multilayer ceramic capacitor according to a fourth preferred embodiment of the present invention.
Figure 11:
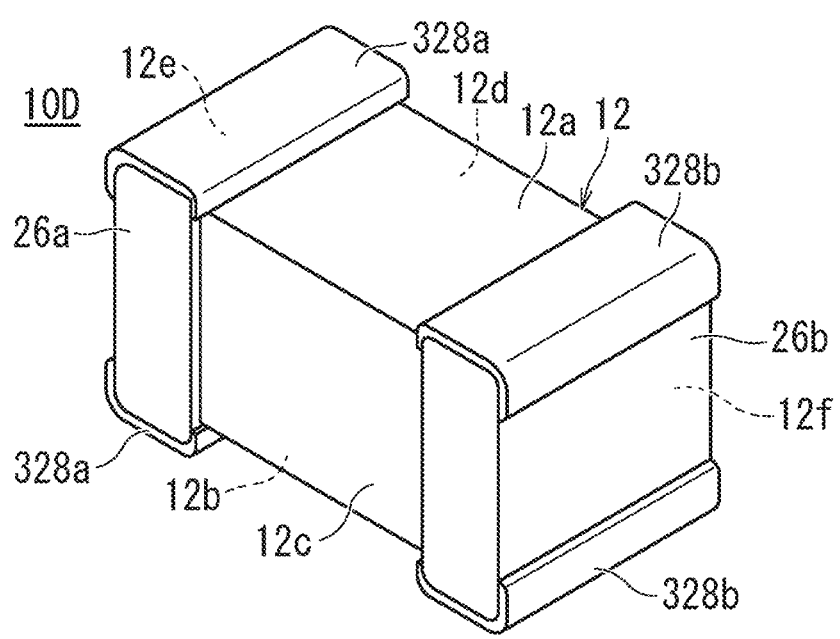
FIG. 11 is an outside perspective view showing the multilayer ceramic capacitor of FIG. 10 in a state before the formation of a plating layer of external electrodes.

FIG. 10 is a schematic cross-sectional view showing a multilayer ceramic capacitor according to a fourth preferred embodiment of the present invention. FIG. 11 is an outside perspective view showing the multilayer ceramic capacitor of FIG. 10 in a state before the formation of a plating layer of external electrodes.

A multilayer ceramic capacitor 10D according to the fourth preferred embodiment is similar in configuration to multilayer ceramic capacitor 10A according to the first preferred embodiment, except that resin layer 28 in the first preferred embodiment is replaced by a resin layer 328. Here, redundant description is omitted.

Resin layer 328 includes a first resin layer 328a and a second resin layer 328b.

First resin layer 328a covers a portion of first underlying electrode layer 26a located on first main surface 12a adjacent to first end surface 12e and extending from first main surface 12a to first end surface 12e. First resin layer 328a also covers a portion of first underlying electrode layer 26a located on second main surface 12b adjacent to first end surface 12e and extending from second main surface 12b to first end surface 12e. Second resin layer 328b covers a portion of second underlying electrode layer 26b located on first main surface 12a adjacent to second end surface 12f and extending from first main surface 12a to second end surface 12f. Second resin layer 328b also covers a portion of second underlying electrode layer 26b located on second main surface 12b adjacent to second end surface 12f and extending from second main surface 12b to second end surface 12f.

Accordingly, even if multilayer ceramic capacitor 10D is subjected to stresses due to the drop impact or bending stresses due to the thermal expansion and contraction of a mounting board caused by thermal cycling, resin layer 328 can define and function as a buffer layer, thus reducing or preventing cracking of multilayer ceramic capacitor 10D.

Further, both first and second main surfaces 12a, 12b can define and function as a mounting surface, which eliminates the need for distinction depending on the direction on an automatic taping machine.

First plating layer 30a covers first underlying electrode layer 26a located on first lateral surface 12c, on second lateral surface 12d, and on first end surface 12e; and covers first resin layer 328a located on first main surface 12a, on second main surface 12b, and on first end surface 12e.

Second plating layer 30b covers second underlying electrode layer 26b located on first lateral surface 12c, on second lateral surface 12d, and on second end surface 12f; and covers second resin layer 328b located on first main surface 12a, on second main surface 12b, and on second end surface 12f.

Thus, in first external electrode 24a, first plating layer 30a is directly in contact with first underlying electrode layer 26a, with no high-resistivity first resin layer 328a interposed therebetween, on first lateral surface 12c, second lateral surface 12d, and first end surface 12e. In second external electrode 24b, second plating layer 30b is directly in contact with second underlying electrode layer 26b, with no high-resistivity second resin layer 328b interposed therebetween, on first lateral surface 12c, second lateral surface 12d, and second end surface 12f. Thus, first and second external electrodes 24a, 24b enable a reduced equivalent series resistance (ESR).

In order to form first and second resin layers 328a, 328b only on a portion of first and second main surfaces 12a, 12b and on a portion of adjacent first and second end surfaces 12e, 12f, the following example of a method may be used. First, stacked bodies 12 are arranged on an array plate, with their second main surface 12b facing upward. Then, second main surface 12b is masked, so that only a portion where a resin layer is to be formed is exposed. Then, a resin-layer paste is applied to second main surface 12b by screen printing, for example. After that, the masking is removed. Similarly, a resin-layer paste is also applied to first main surface 12a and first and second end surfaces 12e, 12f by screen printing, for example.

As an alternative method to form first and second resin layers 328a, 328b, the following example of a method may also be used. First, a resin-layer paste is applied by, for example, dipping, not only to first and second main surfaces 12a, 12b and adjacent first and second end surfaces 12e, 12f but also to other surfaces. Then, a superfluous resin-layer paste on the surfaces other than first and second main surfaces 12a, 12b and adjacent first and second end surfaces 12e, 12f is removed.

5. Fifth Preferred Embodiment

Figure 12:
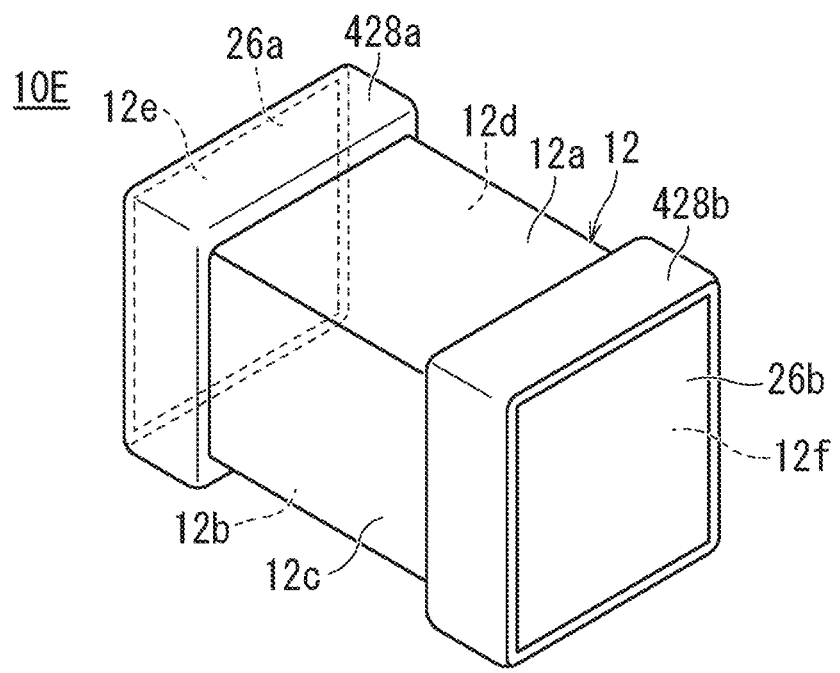
FIG. 12 is an outside perspective view showing a multilayer ceramic capacitor according to a fifth preferred embodiment of the present invention in a state before the formation of a plating layer of external electrodes.

FIG. 12 is an outside perspective view showing a multilayer ceramic capacitor according to a fifth preferred embodiment of the present invention in a state before the formation of a plating layer of external electrodes.

A multilayer ceramic capacitor 10E according to the fifth preferred embodiment is similar in configuration to multilayer ceramic capacitor 10A according to the first preferred embodiment, except that resin layer 28 in the first preferred embodiment is replaced by a resin layer 428. Here, redundant description is omitted.

Resin layer 428 includes a first resin layer 428a and a second resin layer 428b.

First resin layer 428a covers first underlying electrode layer 26a located on first and second main surfaces 12a, 12b and on first and second lateral surfaces 12c, 12d adjacent to first end surface 12e.

Second resin layer 428b covers second underlying electrode layer 26b located on first and second main surfaces 12a, 12b and on first and second lateral surfaces 12c, 12d adjacent to second end surface 12f.

Accordingly, even if multilayer ceramic capacitor 10E is subjected to stresses due to the drop impact or bending stresses due to the thermal expansion and contraction of a mounting board caused by thermal cycling, resin layer 428 can define and function as a buffer layer, thus reducing or preventing cracking of multilayer ceramic capacitor 10E.

Further, all of first and second main surfaces 12a, 12b and first and second lateral surfaces 12c, 12d can define and function as a mounting surface, which eliminates the need for distinction depending on the direction on an automatic taping machine.

First plating layer 30a covers first underlying electrode layer 26a located on first end surface 12e; and covers first resin layer 428a located on first and second main surfaces 12a, 12b and on first and second lateral surfaces 12c, 12d adjacent to first end surface 12e.

Second plating layer 30b covers second underlying electrode layer 26b located on second end surface 12f; and covers second resin layer 428b located on first and second main surfaces 12a, 12b and on first and second lateral surfaces 12c, 12d adjacent to second end surface 12f.

Thus, in first external electrode 24a, first plating layer 30a is directly in contact with first underlying electrode layer 26a, with no high-resistivity first resin layer 428a interposed therebetween, on first end surface 12e. In second external electrode 24b, second plating layer 30b is directly in contact with second underlying electrode layer 26b, with no high-resistivity second resin layer 428b interposed therebetween, on second end surface 12f. Thus, first and second external electrodes 24a, 24b enables a reduced equivalent series resistance (ESR).

In order to form first and second resin layers 428a, 428b only on a portion of first and second main surfaces 12a, 12b and on a portion of adjacent first and second lateral surfaces 12c, 12d, the following example of a method may be used. First, stacked bodies 12 are arranged on an array plate, with their second main surface 12b facing upward. Then, second main surface 12b is masked, so that only a portion where a resin layer is to be formed is exposed. Then, a resin-layer paste is applied to second main surface 12b by screen printing, for example. After that, the masking is removed. Similarly, a resin-layer paste is also applied to first main surface 12a and first and second lateral surfaces 12c, 12d by screen printing, for example.

As an alternative method to form first and second resin layers 428a, 428b, the following example of a method may also be used. First, a resin-layer paste is applied by, for example, dipping, to all the six surfaces of stacked body 12. Then, a superfluous resin-layer paste on the two surfaces, first and second end surfaces 12e, 12f, only has to be removed. This allows easy formation of first and second resin layers 428a, 428b.

6. Sixth Preferred Embodiment

Figure 13:
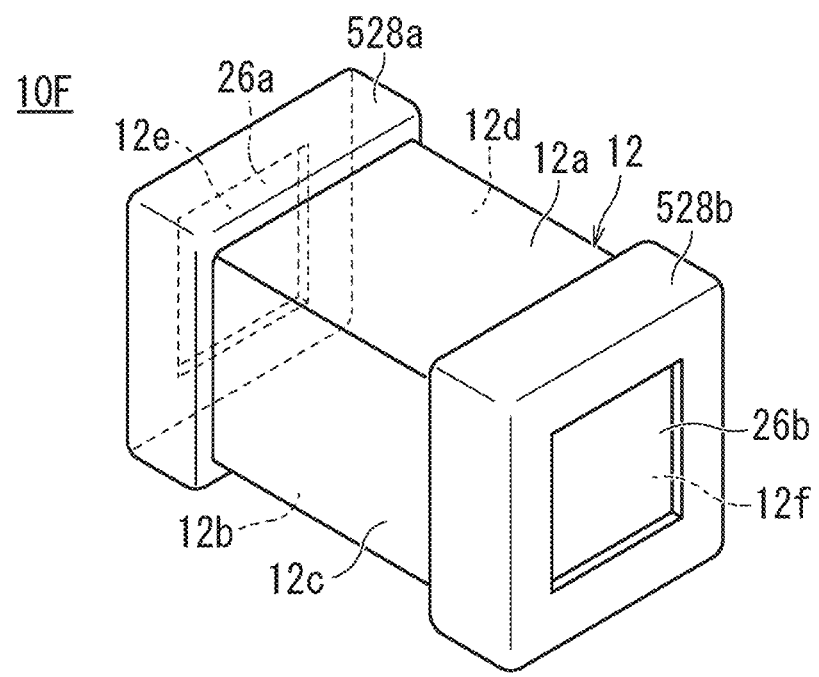
FIG. 13 is an outside perspective view showing a multilayer ceramic capacitor according to a sixth preferred embodiment of the present invention in a state before the formation of a plating layer of external electrodes.

FIG. 13 is an outside perspective view showing a multilayer ceramic capacitor according to a sixth preferred embodiment of the present invention in a state before the formation of a plating layer of external electrodes.

A multilayer ceramic capacitor 10F according to the sixth preferred embodiment is similar in configuration to multilayer ceramic capacitor 10A according to the first preferred embodiment, except that resin layer 28 in the first preferred embodiment is replaced by a resin layer 528. Here, redundant description is omitted.

Resin layer 528 includes a first resin layer 528a and a second resin layer 528b.

First resin layer 528a covers first underlying electrode layer 26a located on first and second main surfaces 12a, 12b and on first and second lateral surfaces 12c, 12d adjacent to first end surface 12e. First resin layer 528a further extends from these surfaces and covers a portion of first underlying electrode layer 26a located on first end surface 12e.

Second resin layer 528b covers second underlying electrode layer 26b located on first and second main surfaces 12a, 12b and on first and second lateral surfaces 12c, 12d adjacent to second end surface 12f. Second resin layer 528b further extends from these surfaces and covers a portion of second underlying electrode layer 26b located on second end surface 12f.

Accordingly, even if multilayer ceramic capacitor 10F is subjected to stresses due to the drop impact or bending stresses due to the thermal expansion and contraction of a mounting board caused by thermal cycling, resin layer 528 can define and function as a buffer layer, thus reducing or preventing cracking of multilayer ceramic capacitor 10F.

Further, all of first and second main surfaces 12a, 12b and first and second lateral surfaces 12c, 12d can define and function as a mounting surface, which eliminates the need for distinction depending on the direction on an automatic taping machine.

Further, since the thin portion of underlying electrode layer 26 (at and around the corners and ridge lines) is covered with resin layer 528, the moisture resistance reliability can be improved.

First plating layer 30a covers first resin layer 528a located on first and second main surfaces 12a, 12b and on first and second lateral surfaces 12c, 12d adjacent to first end surface 12e, and located on first end surface 12e; and covers first underlying electrode layer 26a exposed through first resin layer 528a on first end surface 12e.

Second plating layer 30b covers second resin layer 528b located on first and second main surfaces 12a, 12b and on first and second lateral surfaces 12c, 12d adjacent to second end surface 12f, and located on second end surface 12f; and covers second underlying electrode layer 26b exposed through second resin layer 528b on second end surface 12f.

Thus, in first external electrode 24a, first plating layer 30a is directly in contact with first underlying electrode layer 26a, with no high-resistivity first resin layer 528a interposed therebetween, on first end surface 12e. In second external electrode 24b, second plating layer 30b is directly in contact with second underlying electrode layer 26b, with no high-resistivity second resin layer 528b interposed therebetween, on second end surface 12f. Thus, first and second external electrodes 24a, 24b enable a reduced equivalent series resistance (ESR).

In order to form first and second resin layers 528a, 528b only on a portion of first and second main surfaces 12a, 12b and on a portion of adjacent first lateral surface 12c, second lateral surface 12d, first end surface 12e, and second end surface 12f, the following example of a method may be used. First, stacked bodies 12 are arranged on an array plate, with their second main surface 12b facing upward. Then, second main surface 12b is masked, so that only a portion where a resin layer is to be formed is exposed. Then, a resin-layer paste is applied to second main surface 12b by screen printing, for example. After that, the masking is removed. Similarly, a resin-layer paste is also applied to first main surface 12a, first and second lateral surfaces 12c, 12d, and first and second end surfaces 12e, 12f by screen printing, for example.

As an alternative method to form first and second resin layers 528a, 528b, the following example of a method may also be used. First, a resin-layer paste is applied by, for example, dipping, to all the six surfaces of stacked body 12. Then, a superfluous resin-layer paste on the two surfaces, first and second end surfaces 12e, 12f, only has to be removed. This allows easy formation of first and second resin layers 528a, 528b.

7. Seventh Preferred Embodiment

Figure 14:
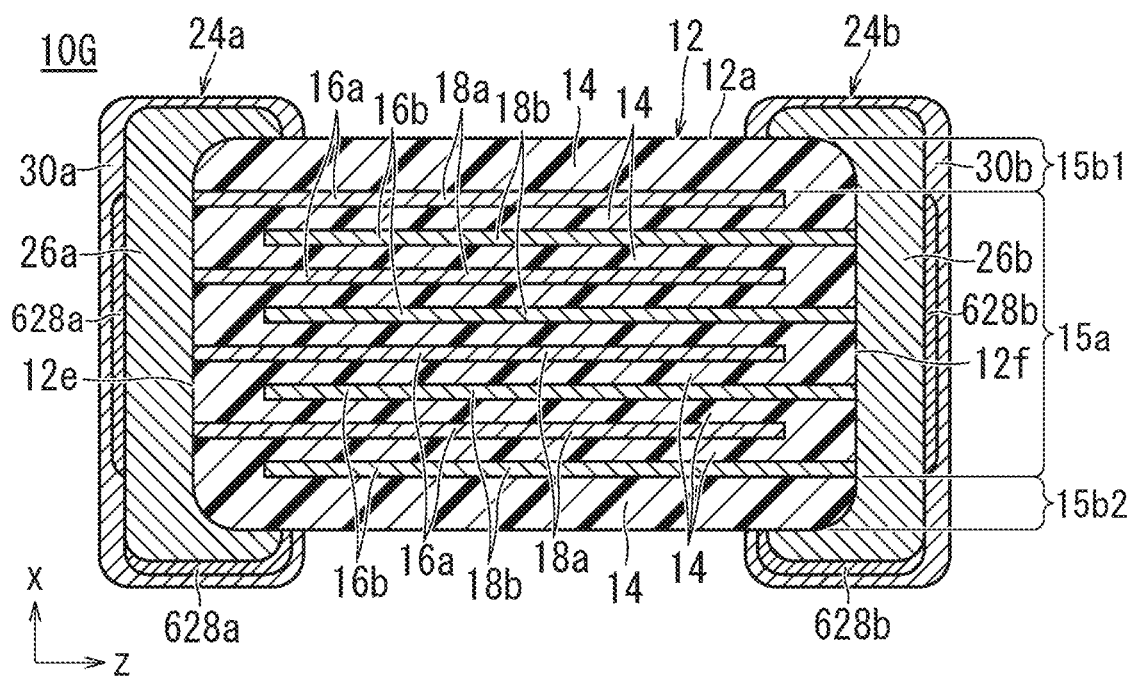
FIG. 14 is a schematic cross-sectional view showing a multilayer ceramic capacitor according to a seventh preferred embodiment of the present invention.
Figure 15:
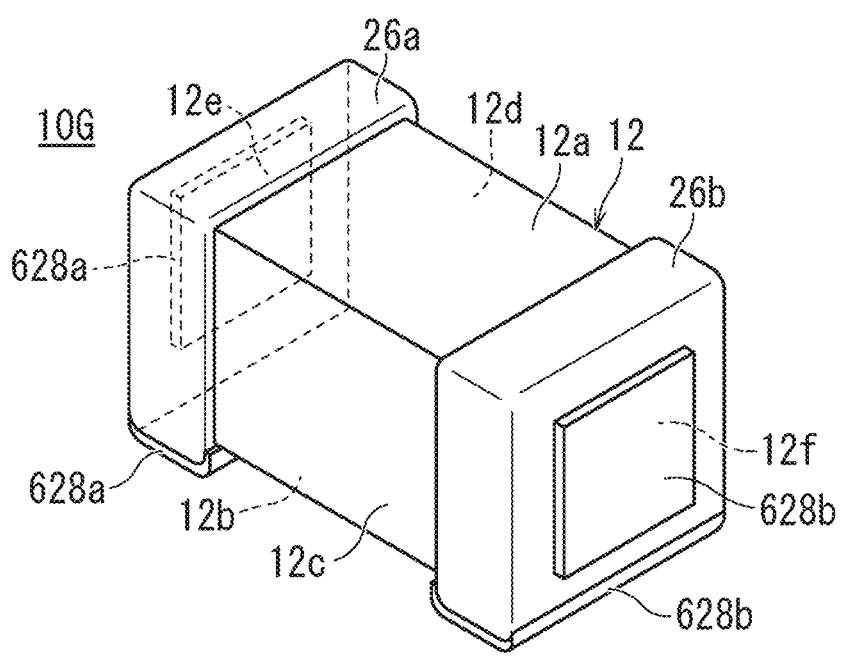
FIG. 15 is an outside perspective view showing the multilayer ceramic capacitor of FIG. 14 in a state before the formation of a plating layer of external electrodes.

FIG. 14 is a schematic cross-sectional view showing a multilayer ceramic capacitor according to a seventh preferred embodiment of the present invention. FIG. 15 is an outside perspective view showing the multilayer ceramic capacitor of FIG. 14 in a state before the formation of a plating layer of external electrodes.

A multilayer ceramic capacitor 10G according to the seventh preferred embodiment is similar in configuration to multilayer ceramic capacitor 10A according to the first preferred embodiment, except that resin layer 28 in the first preferred embodiment is replaced by a resin layer 628. Here, redundant description is omitted.

Resin layer 628 includes a first resin layer 628a and a second resin layer 628b.

First resin layer 628a covers first underlying electrode layer 26a located on second main surface 12b adjacent to first end surface 12e, and covers a portion of first underlying electrode layer 26a located at a central portion of first end surface 12e.

Second resin layer 628b covers second underlying electrode layer 26b located on second main surface 12b adjacent to second end surface 12f, and covers a portion of second underlying electrode layer 26b located at a central portion of second end surface 12f.

Accordingly, even if multilayer ceramic capacitor 10G is subjected to stresses due to the drop impact or bending stresses due to the thermal expansion and contraction of a mounting board caused by thermal cycling, resin layer 628 can define and function as a buffer layer, thus reducing or preventing cracking of multilayer ceramic capacitor 10G.

Resin layer 628 also defines and functions as a protective layer to prevent water from entering internal electrode layers 16 through underlying electrode layer 26, thus improving the resistance to moisture.

First plating layer 30a covers first underlying electrode layer 26a located on first main surface 12a, on first and second lateral surfaces 12c, 12d, and on first end surface 12e; and covers first resin layer 628a located on second main surface 12b and on first end surface 12e.

Second plating layer 30b covers second underlying electrode layer 26b located on first main surface 12a, on first and second lateral surfaces 12c, 12d, and on second end surface 12f; and covers second resin layer 628b located on second main surface 12b and on second end surface 12f.

Thus, in first external electrode 24a, first plating layer 30a is directly in contact with first underlying electrode layer 26a, with no high-resistivity first resin layer 628a interposed therebetween, on first main surface 12a, first lateral surface 12c, second lateral surface 12d, and first end surface 12e. In second external electrode 24b, second plating layer 30b is directly in contact with second underlying electrode layer 26b, with no high-resistivity second resin layer 628b interposed therebetween, on first main surface 12a, first lateral surface 12c, second lateral surface 12d, and second end surface 12f. Thus, first and second external electrodes 24a, 24b enable a reduced equivalent series resistance (ESR).

In order to form first and second resin layers 628a, 628b only on a portion of second main surface 12b and on a portion of adjacent first and second end surfaces 12e, 12f, the following example of a method may be used. First, stacked bodies 12 are arranged on an array plate, with their second main surface 12b facing upward. Then, second main surface 12b is masked, so that only a portion where a resin layer is to be formed is exposed. Then, a resin-layer paste is applied to second main surface 12b by screen printing, for example. After that, the masking is removed. Similarly, a resin-layer paste is also applied to first and second end surfaces 12e, 12f by screen printing, for example.

As an alternative method to form first and second resin layers 628a, 628b (only on a portion of second main surface 12b and on a portion of adjacent first and second end surfaces 12e, 12f), the following example of a method may also be used. First, a resin-layer paste is applied by, for example, dipping, not only to second main surface 12b and adjacent first and second end surfaces 12e, 12f but also to other surfaces. Then, a superfluous resin-layer paste on the surfaces other than second main surface 12b and adjacent first and second end surfaces 12e, 12f is removed. This allows easy formation of first and second resin layers 628a, 628b.

8. Eighth Preferred Embodiment

Figure 16:
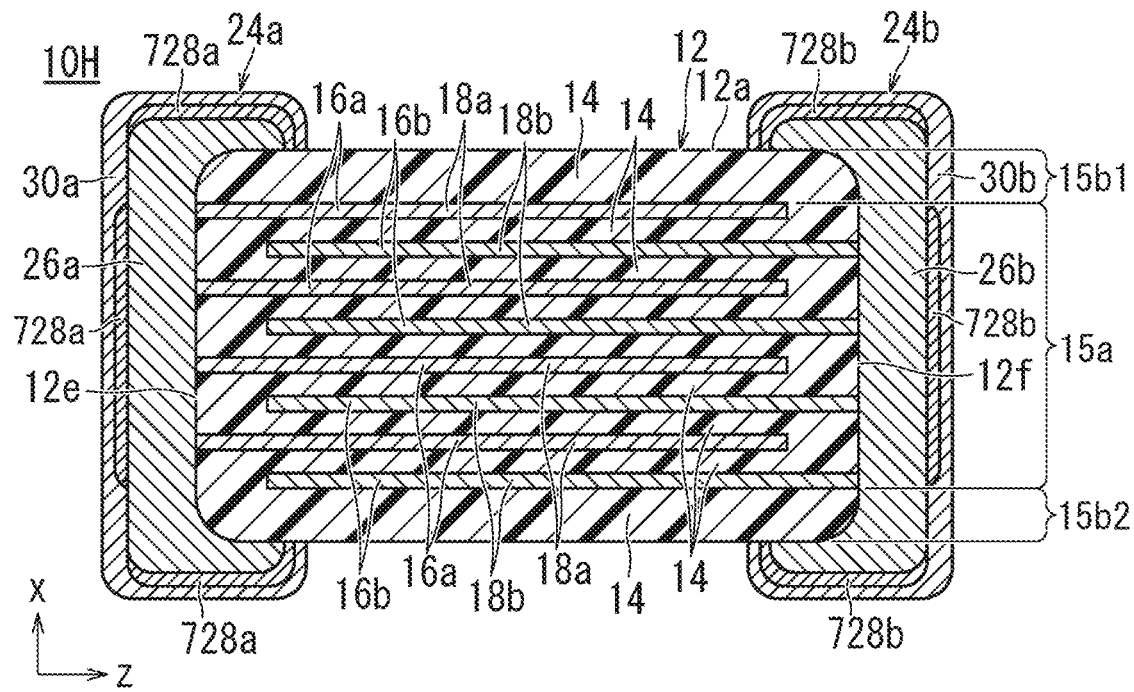
FIG. 16 is a schematic cross-sectional view showing a multilayer ceramic capacitor according to an eighth preferred embodiment of the present invention.
Figure 17:
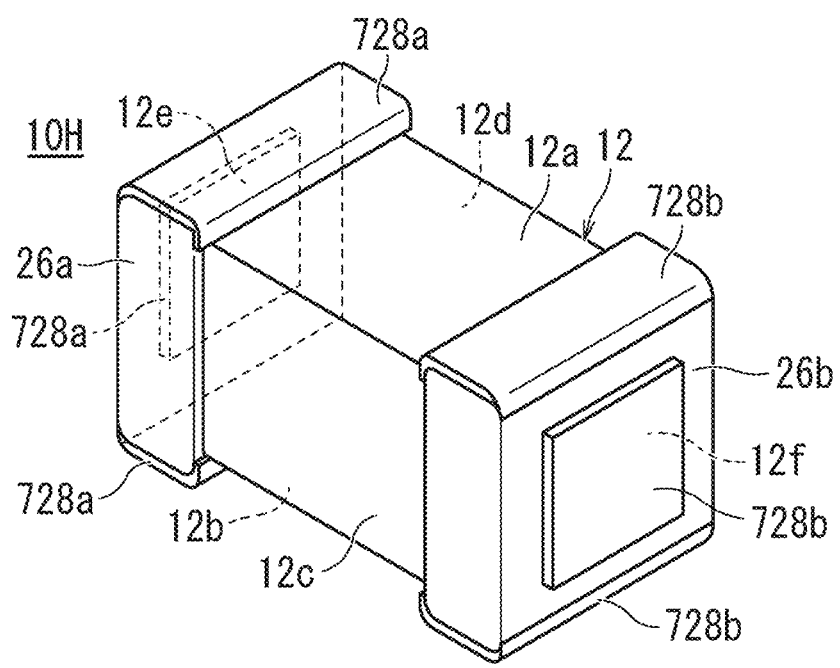
FIG. 17 is an outside perspective view showing the multilayer ceramic capacitor of FIG. 16 in a state before the formation of a plating layer of external electrodes.

FIG. 16 is a schematic cross-sectional view showing a multilayer ceramic capacitor according to an eighth preferred embodiment of the present invention. FIG. 17 is an outside perspective view showing the multilayer ceramic capacitor of FIG. 16 in a state before the formation of a plating layer of external electrodes.

A multilayer ceramic capacitor 10H according to the eighth preferred embodiment is similar in configuration to multilayer ceramic capacitor 10A according to the first preferred embodiment, except that resin layer 28 in the first preferred embodiment is replaced by a resin layer 728. Here, redundant description is omitted.

Resin layer 728 includes a first resin layer 728a and a second resin layer 728b.

First resin layer 728a covers first underlying electrode layer 26a located on first and second main surfaces 12a, 12b adjacent to first end surface 12e; and covers a portion of first underlying electrode layer 26a located at the central portion of first end surface 12e.

Second resin layer 728b covers second underlying electrode layer 26b located on first and second main surfaces 12a, 12b adjacent to second end surface 12f; and covers a portion of second underlying electrode layer 26b located at the central portion of second end surface 12f.

Accordingly, even if multilayer ceramic capacitor 10H is subjected to stresses due to the drop impact or bending stresses due to the thermal expansion and contraction of a mounting board caused by thermal cycling, resin layer 728 can define and function as a buffer layer, thus reducing or preventing cracking of multilayer ceramic capacitor 10H.

Resin layer 728 also defines and functions as a protective layer to prevent water from entering internal electrode layers 16 through underlying electrode layer 26, thus improving the resistance to moisture.

Further, both of first and second main surfaces 12a, 12b can define and function as a mounting surface, which eliminates the need for distinction depending on the direction on an automatic taping machine.

First plating layer 30a covers first underlying electrode layer 26a located on first lateral surface 12c, on second lateral surface 12d, and on first end surface 12e; and covers first resin layer 728a located on first main surface 12a, on second main surface 12b, and on first end surface 12e.

Second plating layer 30b covers second underlying electrode layer 26b located on first lateral surface 12c, on second lateral surface 12d, and on second end surface 12f; and covers second resin layer 728b located on first main surface 12a, on second main surface 12b, and on second end surface 12f.

Thus, in first external electrode 24a, first plating layer 30a is directly in contact with first underlying electrode layer 26a, with no high-resistivity first resin layer 728a interposed therebetween, on first lateral surface 12c, second lateral surface 12d, and first end surface 12e. In second external electrode 24b, second plating layer 30b is directly in contact with second underlying electrode layer 26b, with no high-resistivity second resin layer 728b interposed therebetween, on first lateral surface 12c, second lateral surface 12d, and second end surface 12f. Thus, first and second external electrodes 24a, 24b enable a reduced equivalent series resistance (ESR).

In order to form first and second resin layers 728a, 728b only on a portion of first and second main surfaces 12a, 12b and on a portion of adjacent first and second end surfaces 12e, 12f, the following example of a method may be used. First, stacked bodies 12 are arranged on an array plate, with their second main surface 12b facing upward. Then, second main surface 12b is masked, so that only a portion where a resin layer is to be formed is exposed. Then, a resin-layer paste is applied to second main surface 12b by screen printing, for example. After that, the masking is removed. Similarly, a resin-layer paste is also applied to first main surface 12a and first and second end surfaces 12e, 12f by screen printing, for example.

As an alternative method to form first and second resin layers 728a, 728b (only on a portion of first and second main surfaces 12a, 12b and on a portion of adjacent first and second end surfaces 12e, 12f), the following example of a method may also be used. First, a resin-layer paste is applied by, for example, dipping, not only to first and second main surfaces 12a, 12b and adjacent first and second end surfaces 12e, 12f but also to other surfaces. Then, a superfluous resin-layer paste on the surfaces other than first and second main surfaces 12a, 12b and adjacent first and second end surfaces 12e, 12f is removed. This allows easy formation of first and second resin layers 728a, 728b.

9. Ninth Preferred Embodiment

Figure 18:
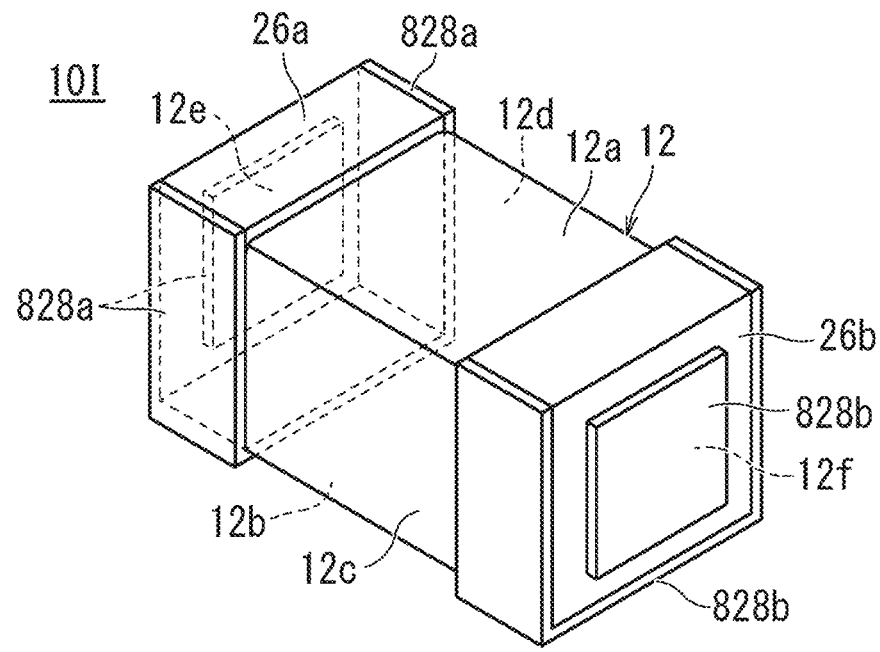
FIG. 18 is an outside perspective view showing a multilayer ceramic capacitor according to a ninth preferred embodiment of the present invention in a state before the formation of a plating layer of external electrodes.

FIG. 18 is an outside perspective view showing a multilayer ceramic capacitor according to a ninth preferred embodiment of the present invention in a state before the formation of a plating layer of external electrodes.

A multilayer ceramic capacitor 10I according to the ninth preferred embodiment is similar in configuration to multilayer ceramic capacitor 10A according to the first preferred embodiment, except that resin layer 28 in the first preferred embodiment is replaced by a resin layer 828. Here, redundant description is omitted.

Resin layer 828 includes a first resin layer 828a and a second resin layer 828b.

First resin layer 828a covers first underlying electrode layer 26a located on second main surface 12b and on first and second lateral surfaces 12c, 12d adjacent to first end surface 12e; and covers a portion of first underlying electrode layer 26a located at the central portion of first end surface 12e.

Second resin layer 828b covers second underlying electrode layer 26b located on second main surface 12b and on first and second lateral surfaces 12c, 12d adjacent to second end surface 12f; and covers a portion of second underlying electrode layer 26b located at the central portion of second end surface 12f.

Accordingly, even if multilayer ceramic capacitor 10I is subjected to stresses due to the drop impact or bending stresses due to the thermal expansion and contraction of a mounting board caused by thermal cycling, resin layer 828 can define and function as a buffer layer, thus reducing or preventing cracking of multilayer ceramic capacitor 10I.

Resin layer 828 also defines and functions as a protective layer to prevent water from entering internal electrode layers 16 through underlying electrode layer 26, thus improving the resistance to moisture.

Further, all of second main surface 12b and first and second lateral surfaces 12c, 12d can define and function as a mounting surface, which eliminates the need for distinction depending on the direction on an automatic taping machine.

First plating layer 30a covers first underlying electrode layer 26a located on first main surface 12a and on first end surface 12e, and covers first resin layer 828a located on second main surface 12b, on first and second lateral surfaces 12c, 12d, and on first end surface 12e.

Second plating layer 30b covers second underlying electrode layer 26b located on first main surface 12a and on second end surface 12f, and covers second resin layer 828b located on second main surface 12b, on first and second lateral surfaces 12c, 12d, and on second end surface 12f.

Thus, in first external electrode 24a, first plating layer 30a is directly in contact with first underlying electrode layer 26a, with no high-resistivity first resin layer 828a interposed therebetween, on first main surface 12a and first end surface 12e. In second external electrode 24b, second plating layer 30b is directly in contact with second underlying electrode layer 26b, with no high-resistivity second resin layer 828b interposed therebetween, on first main surface 12a and second end surface 12f. Thus, first and second external electrodes 24a, 24b enable a reduced equivalent series resistance (ESR).

In order to form first and second resin layers 828a, 828b only on a portion of second main surface 12b and on a portion of adjacent first lateral surface 12c, second lateral surface 12d, first end surface 12e, and second end surface 12f, the following example of a method may be used. First, stacked bodies 12 are arranged on an array plate, with their second main surface 12b facing upward. Then, second main surface 12b is masked, so that only a portion where a resin layer is to be formed is exposed. Then, a resin-layer paste is applied to second main surface 12b by screen printing, for example. After that, the masking is removed. Similarly, a resin-layer paste is also applied to first and second lateral surfaces 12c, 12d and first and second end surfaces 12e, 12f by screen printing, for example.

As an alternative method to form first and second resin layers 828a, 828b (only on a portion of second main surface 12b and on a portion of adjacent first lateral surface 12c, second lateral surface 12d, first end surface 12e, and second end surface 12f), the following example of a method may also be used. First, a resin-layer paste is applied by, for example, dipping, not only to second main surface 12b and adjacent first and second lateral surfaces 12c, 12d and first and second end surfaces 12e, 12f but also to other surfaces. Then, a superfluous resin-layer paste on the surfaces other than second main surface 12b and adjacent first and second lateral surfaces 12c, 12d and first and second end surfaces 12e, 12f is removed. This allows easy formation of first and second resin layers 828a, 828b.

10. Tenth Preferred Embodiment

Figure 19:
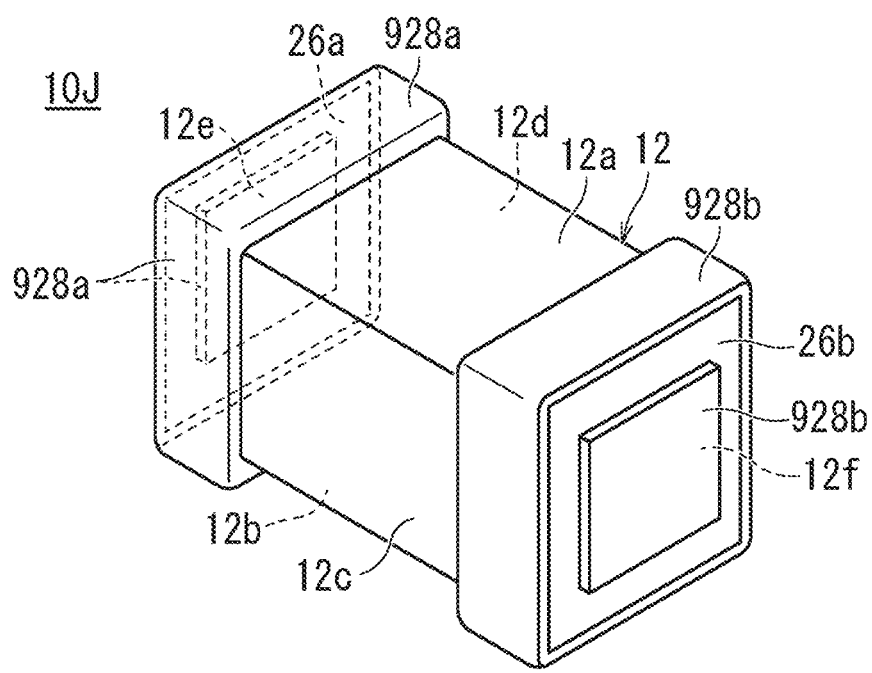
FIG. 19 is an outside perspective view showing a multilayer ceramic capacitor according to a tenth preferred embodiment of the present invention in a state before the formation of a plating layer of external electrodes.

FIG. 19 is an outside perspective view showing a multilayer ceramic capacitor according to a tenth preferred embodiment of the present invention in a state before the formation of a plating layer of external electrodes.

A multilayer ceramic capacitor 10J according to the tenth preferred embodiment is similar in configuration to multilayer ceramic capacitor 10A according to the first preferred embodiment, except that resin layer 28 in the first preferred embodiment is replaced by a resin layer 928. Here, redundant description is omitted.

Resin layer 928 includes a first resin layer 928a and a second resin layer 928b.

First resin layer 928a covers first underlying electrode layer 26a located on first and second main surfaces 12a, 12b and on first and second lateral surfaces 12c, 12d adjacent to first end surface 12e, and covers a portion of first underlying electrode layer 26a located at the central portion of first end surface 12e.

Second resin layer 928b covers second underlying electrode layer 26b located on first and second main surfaces 12a, 12b and on first and second lateral surfaces 12c, 12d adjacent to second end surface 12f, and covers a portion of second underlying electrode layer 26b located at the central portion of second end surface 12f.

Accordingly, even if multilayer ceramic capacitor 10J is subjected to stresses due to the drop impact or bending stresses due to the thermal expansion and contraction of a mounting board caused by thermal cycling, resin layer 928 can define and function as a buffer layer, thus reducing or preventing cracking of multilayer ceramic capacitor 10J.

Resin layer 928 also defines and functions as a protective layer to prevent water from entering internal electrode layers 16 through underlying electrode layer 26, thus improving the resistance to moisture.

Further, all of first and second main surfaces 12a, 12b and first and second lateral surfaces 12c, 12d can define and function as a mounting surface, which eliminates the need for distinction depending on the direction on an automatic taping machine.

First plating layer 30a covers first underlying electrode layer 26a located on first end surface 12e, and covers first resin layer 928a located on first and second main surfaces 12a, 12b, on first and second lateral surfaces 12c, 12d, and on first end surface 12e.

Second plating layer 30b covers second underlying electrode layer 26b located on second end surface 12f, and covers second resin layer 928b located on first and second main surfaces 12a, 12b, on first and second lateral surfaces 12c, 12d, and on second end surface 12f.

Thus, in first external electrode 24a, first plating layer 30a is directly in contact with first underlying electrode layer 26a, with no high-resistivity first resin layer 928a interposed therebetween, on first end surface 12e. In second external electrode 24b, second plating layer 30b is directly in contact with second underlying electrode layer 26b, with no high-resistivity second resin layer 928b interposed therebetween, on second end surface 12f. Thus, first and second external electrodes 24a, 24b enable a reduced equivalent series resistance (ESR).

In order to form first and second resin layers 928a, 928b only on a portion of first and second main surface, 12a, 12b and on a portion of adjacent first lateral surface 12c, second lateral surface 12d, first end surface 12e, and second end surface 12f, the following example of a method may be used. First, stacked bodies 12 are arranged on an array plate, with their second main surface 12b facing upward. Then, second main surface 12b is masked, so that only a portion where a resin layer is to be formed is exposed. Then, a resin-layer paste is applied to second main surface 12b by screen printing, for example. After that, the masking is removed. Similarly, a resin-layer paste is also applied to first main surface 12a, first and second lateral surfaces 12c, 12d, and first and second end surfaces 12e, 12f by screen printing, for example.

Alternatively, first and second resin layers 928a, 928b may be formed by applying a resin-layer paste by, for example, dipping, to all the six faces, and then removing a superfluous resin-layer paste.

Experimental Example

1. Multilayer Ceramic Capacitor in Working Example

As a working example, multilayer ceramic capacitors 10A according to the first preferred embodiment described above were produced according to the above-described manufacturing method. The presence or absence of cracking as a result of a substrate bending test and the ESR value were examined. The specifications of the capacitors in the working example were as follows.

Dimension L×W×T: about 3.2 mm×about 1.6 mm×about 1.6
Ceramic material: $BaTiO_3$
Capacitance: about 1 µF
Rated voltage: about 50 V
Internal electrodes: Ni
Structure of external electrodes
Underlying electrode layer
Material of underlying electrode layer: Electrode material containing conductive metal (Cu) and glass component
Thickness of underlying electrode layer: About 80 µm (the thickest portion at the center or approximate center of end surfaces)
Resin layer
Thermosetting resin: Epoxy
Thickness of the thickest portion of first and second resin layers at the center or approximate center in the length direction of the first and second underlying electrode layers located on the second main surface: about 30 µm
Plating layer
Double-layer structure composed of Ni and Sn plating layers
Thickness of Ni plating layer: about 3 µm
Thickness of Sn plating layer: about 4 µm 2. Multilayer Ceramic Capacitor in Comparative Example 1

As comparative example 1, multilayer ceramic capacitors with no resin layer were produced. The presence or absence of cracking as a result of a substrate bending test and the ESR value were examined. The specifications of the capacitors in comparative example 1 were as follows.

Dimension L×W×T: about 3.2 mm×about 1.6 mm×about 1.6 mm
Ceramic material: $BaTiO_3$
Capacitance: about 1 µF
Rated voltage: about 50 V
Internal electrodes: Ni
Structure of external electrodes
Underlying electrode layer
Material of underlying electrode layer: Electrode material containing conductive metal (Cu) and glass component
Thickness of underlying electrode layer: about 80 µm (the thickest portion at the center or approximate center of end surfaces)
Plating layer
Double-layer structure composed of Ni and Sn plating layers
Thickness of Ni plating layer: about 3 µm
Thickness of Sn plating layer: about 4 µm 3. Multilayer Ceramic Capacitor in Comparative Example 2

As comparative example 2, multilayer ceramic capacitors were produced having a thermosetting conductive resin layer between an underlying electrode layer and a plating layer. The presence or absence of cracking as a result of a substrate bending test and the ESR value were examined. The specifications of the capacitors in comparative example 2 were as follows.

DimensionL×W×T: about 3.2 mm×about 1.6 mm×about 1.6 mm
Ceramic material: $BaTiO_3$ Capacitance: about 1 μF
Rated voltage: 50 V
Internal electrodes: Ni
Structure of external electrodes
Underlying electrode layer
Material of underlying electrode layer: Electrode material containing conductive metal (Cu) and glass component
Thickness of underlying electrode layer: about 80 μm (the thickest portion at the center or approximate center of end surfaces)
Conductive resin layer
Metal filler of conductive resin layer: Ag-coated Cu
Resin of conductive resin layer: Epoxy (having a thermal curing temperature of about 200° C.)
Thickness of the thickest portion of first and second conductive resin layers at the center or approximate center in the height direction of the first and second underlying electrode layers located on the first and second end surfaces: about 80 μm
Thickness of the thickest portion of first and second conductive resin layers at the center or approximate center in the length direction of the first and second underlying electrode layers located on the first and second main surfaces and on first and second lateral surfaces: about 30 μm
The conductive resin layer was formed as follows: a conductive resin paste containing a thermosetting resin and metal component was applied to an underlying electrode layer; the conductive resin paste was then heat-treated at a temperature of not less than about 250° C. and not more than about 550° C. under a $N_2$ atmosphere; and then the resin was thermally cured.
Plating layer
Double-layer structure composed of Ni and Sn plating layers
Thickness of Ni plating layer: about 3 μm
Thickness of Sn plating layer: about 4 μm 4. Test Method (1) Method of Bending Test Multilayer ceramic capacitor samples were mounted on a JEITA standard substrate with lands using LF solder by reflowing under a peak temperature of about 250° C. From the side opposite to the capacitor-mounted face of the substrate, a mechanical stress was applied to the substrate to cause a certain amount of deflection (about 5 mm), using a pushing tool having a curvature radius R of about 230 mm. After that, the capacitor samples were removed from the substrate, and cross section polishing was performed on a lateral surface of each sample in the direction of a line connecting the two lateral surfaces. Using a microscope, cracking was examined in cross sections at three locations: at the location where the internal electrodes started to appear, at the center in the W dimension, and at the location where the internal electrodes disappeared. The number of samples was ten, each with three locations.

(2) Method of Measuring Equivalent Series Resistance (ESR)

The equivalent series resistance (ESR) was measured using a precision LCR meter (E4980A, manufactured by Agilent Technologies, Inc.) at a measurement frequency of about 1 MHz and with a measurement voltage of about 500 mV. The number of samples was ten.

The measurement results of ESR are shown in table 1, and the results of bending test are shown in table 2.

TABLE 1

| | ESR(mΩ) | | |
|---|---|---|---|
| Sample No. | Working example | Comparison example 1 | Comparison example 2 |
| 1 | 8.57 | 7.43 | 20.05 |
| 2 | 7.68 | 7.56 | 20.40 |
| 3 | 7.92 | 7.52 | 17.66 |
| 4 | 7.78 | 7.51 | 18.12 |
| 5 | 8.21 | 7.72 | 18.81 |
| 6 | 8.11 | 7.57 | 18.94 |
| 7 | 7.92 | 7.57 | 20.20 |
| 8 | 7.75 | 8.31 | 19.67 |
| 9 | 8.60 | 7.38 | 19.23 |
| 10 | 8.01 | 7.91 | 19.10 |
| Average | 8.06 | 7.65 | 19.22 |
| Maximum | 8.60 | 8.31 | 20.40 |
| Minimum | 7.68 | 7.38 | 17.66 |
| Standard deviation | 0.32 | 0.28 | 0.86 |

TABLE 2

| | Number of cracked samples | | |
|---|---|---|---|
| | Working example | Comparison example 1 | Comparison example 2 |
| Location where internal electrodes start to appear | 0/30 | 18/30 | 0/30 |
| Center in W dimension | 0/30 | 16/30 | 0/30 |
| Location where internal electrodes disappear | 0/30 | 16/30 | 0/30 |

Table 1 shows that the capacitors in the working example have a lower ESR. Each of these capacitors includes external electrodes including an underlying electrode layer, a resin layer, and a plating layer, where the underlying electrode layer is exposed through the resin layer and directly in contact with the plating layer, and where the resin layer contains a thermosetting resin and no metal component. On the other hand, the capacitors in comparative example 2 include external electrodes including an epoxy thermosetting conductive resin layer containing metallic powder. The contact of the metallic powder provides a current-carrying path, thus increasing the resistance value and thus increasing the ESR.

Further, Table 2 shows that the capacitors in the working example can be prevented from cracking. Each of these capacitors includes external electrodes including an underlying electrode layer and a plating layer, with a resin layer interposed therebetween, where the resin layer contains a thermosetting resin and no metal component. Accordingly, even if the capacitor is subjected to bending stresses, the resin layer can define and function as a buffer layer, thus preventing cracking of the capacitor. On the other hand, the capacitors in comparative example 1 include no resin layer. Therefore, when bending stresses occur, the external electrodes cannot release the stresses applied to the mounting board (the deformation of the mounting board) and thus cannot prevent cracking.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
a stacked body including a plurality of ceramic layers and a plurality of internal electrode layers which are stacked, the stacked body including a first main surface and a second main surface opposite to each other in a stacking direction, a first end surface and a second end surface opposite to each other in a length direction orthogonal to or substantially orthogonal to the stacking direction, and a first lateral surface and a second lateral surface opposite to each other in a width direction orthogonal to or substantially orthogonal to the stacking direction and the length direction;
a first external electrode disposed on the first end surface; and
a second external electrode disposed on the second end surface; wherein
the second main surface of the stacked body defines and functions as a mounting surface;
the first external electrode includes:
a first underlying electrode layer including a conductive metal;
a first resin layer including a resin and no metal component; and
a first plating layer;
the second external electrode includes:
a second underlying electrode layer including a conductive metal;
a second resin layer including a resin and no metal component; and
a second plating layer;
the first underlying electrode layer covers the first end surface, extends from the first end surface, and covers a portion of each of the first main surface, the second main surface, the first lateral surface, and the second lateral surface;
the second underlying electrode layer covers the second end surface, extends from the second end surface, and covers a portion of each of the first main surface, the second main surface, the first lateral surface, and the second lateral surface;
the first resin layer covers the first underlying electrode layer at least on the second main surface adjacent to the first end surface;
the second resin layer covers the second underlying electrode layer at least on the second main surface adjacent to the second end surface;
the first plating layer covers a portion of a surface of the first underlying electrode layer that is not covered with the first resin layer, and completely covers the first resin layer; and
the second plating layer covers a portion of a surface of the second underlying electrode layer that is not covered with the second resin layer, and completely covers the second resin layer.

2. The multilayer ceramic electronic component according to claim 1, wherein
the first resin layer located on the second main surface extends to a portion of the first end surface; and
the second resin layer located on the second main surface extends to a portion of the second end surface.

3. The multilayer ceramic electronic component according to claim 1, wherein
the first resin layer covers the first underlying electrode layer on the first main surface adjacent to the first end surface; and
the second resin layer covers the second underlying electrode layer on the first main surface adjacent to the second end surface.

4. The multilayer ceramic electronic component according to claim 3, wherein
the first resin layer located on the first main surface extends to a portion of the first end surface, and
the second resin layer located on the first main surface extends to a portion of the second end surface.

5. The multilayer ceramic electronic component according to claim 1, wherein
the first resin layer covers the first underlying electrode layer on the first lateral surface and on the second lateral surface adjacent to the first end surface; and
the second resin layer covers the second underlying electrode layer on the first lateral surface and on the second lateral surface adjacent to the second end surface.

6. The multilayer ceramic electronic component according to claim 5, wherein
the first resin layer located on the first lateral surface and on the second lateral surface adjacent to the first end surface extends to a portion of the first end surface; and
the second resin layer located on the first lateral surface and on the second lateral surface adjacent to the second end surface extends to a portion of the second end surface.

7. The multilayer ceramic electronic component according to claim 1, wherein
the first resin layer covers the first underlying electrode layer on the first end surface, the first resin layer located on the first end surface being separate from the first resin layer located on the second main surface adjacent to the first end surface; and
the second resin layer covers the second underlying electrode layer on the second end surface, the second resin layer located on the second end surface being separate from the second resin layer located on the second main surface adjacent to the second end surface.

8. The multilayer ceramic electronic component according to claim 7, wherein
the first resin layer covers the first underlying electrode layer on the first main surface adjacent to the first end surface; and
the second resin layer covers the second underlying electrode layer on the first main surface adjacent to the second end surface.

9. The multilayer ceramic electronic component according to claim 7, wherein
the first resin layer covers the first underlying electrode layer on the first lateral surface and on the second lateral surface adjacent to the first end surface; and
the second resin layer covers the second underlying electrode layer on the first lateral surface and on the second lateral surface adjacent to the second end surface.

10. The multilayer ceramic electronic component according to claim 1, wherein the stacked body includes rounded corners and rounded ridge lines.

11. The multilayer ceramic electronic component according to claim 1, wherein
the stacked body includes an effective layer portion, a first outer layer portion, and a second outer layer portion;
the effective layer portion includes the plurality of internal electrode layers and ceramic layers of the plurality of ceramic layers disposed therebetween; and the effective layer portion is between the first and second outer layer portions.

12. The multilayer ceramic electronic component according to claim 1, wherein dimensions of the stacked body are not less than about 0.2 mm and not more than about 10.0 mm in the length direction, not less than about 0.1 mm and not more than about 10.0 mm in the width direction, and not less than about 0.1 mm and not more than about 5.0 mm in the stacking direction.

13. The multilayer ceramic electronic component according to claim 1, wherein the plurality of ceramic layers are made of a dielectric ceramic including at least one of $BaTiO_3$, $CaTiO_3$, $SrTiO_3$, or $CaZrO_3$ as a primary component.

14. The multilayer ceramic electronic component according to claim 13, wherein the plurality of ceramic layers include at least one of Mn compounds, Fe compounds, Cr compounds, Co compounds, and Ni compounds as a secondary component.

15. The multilayer ceramic electronic component according to claim 1, wherein
the plurality of internal electrode layers include a plurality of first internal electrode layers and a plurality of second internal electrode layers that are alternately disposed in the stacking direction;
the plurality of first internal electrode layers are electrically connected to the first external electrode; and
the plurality of second internal electrode layers are electrically connected to the second external electrode.

16. The multilayer ceramic electronic component according to claim 1, wherein the conductive metal of each of the first and second underlying electrode layers includes at least one of Cu, Ni, Ag, Pb, Pd, Ag—Pb alloy, Ag—Pd alloy, and Au.

17. The multilayer ceramic electronic component according to claim 1, wherein each of the first and second underlying electrode layers includes a glass component in addition to the conductive metal.

18. The multilayer ceramic electronic component according to claim 17, wherein the glass component includes at least one of B, Si, Ba, Mg, Al, and Li.

19. The multilayer ceramic electronic component according to claim 1, wherein each of the first and second underlying electrode layers has a thickness of not less than about 10 μm and not more than about 150 μm on the respective first and second end surfaces.

20. The multilayer ceramic electronic component according to claim 1, wherein each of the first and second plating layers includes a lower plating layer provided on the stacked body and an upper plating layer provided on the lower plating layer.

* * * * *